US006712387B1

(12) United States Patent
Breed et al.

(10) Patent No.: US 6,712,387 B1
(45) Date of Patent: *Mar. 30, 2004

(54) METHOD AND APPARATUS FOR CONTROLLING DEPLOYMENT OF A SIDE AIRBAG

(75) Inventors: David S. Breed, Boonton Township, Morris County, NJ (US); Wilbur E. DuVall, Kimberling City, MO (US); Wendell C. Johnson, San Diego, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,535

(22) Filed: Nov. 10, 1999

Related U.S. Application Data

(63) Continuation-in-part of application No. 09/047,703, filed on Mar. 25, 1998, now Pat. No. 6,039,139, which is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, and a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned.

(51) Int. Cl.$^7$ .............................................. B60R 21/32

(52) U.S. Cl. ...................... 280/735; 180/272; 180/273

(58) Field of Search .................... 280/735; 180/271, 180/272, 273

(56) References Cited

U.S. PATENT DOCUMENTS 3,275,975 A    9/1966   King ............................. 340/1

(List continued on next page.)

FOREIGN PATENT DOCUMENTS

DE           3802159       8/1989    ................. 280/735

(List continued on next page.)

OTHER PUBLICATIONS

"Trends in Sensing Frontal Impacts", D. Breed et al., SAE Paper No. 890750, Feb., 1989.

(List continued on next page.)

*Primary Examiner*—Paul N. Dickson
*Assistant Examiner*—Toan C To
(74) *Attorney, Agent, or Firm*—Brian Roffe

(57) ABSTRACT

An arrangement and method for controlling deployment of a side airbag from an airbag module to protect an occupant in a seat of a vehicle in a crash. The presence of an occupant and/or position of the occupant or a part thereof is/are determined and deployment of the side airbag is controlled based thereon. To determine the presence of the occupant and/or position of the occupant or part thereof, a transducer is arranged to receive waves from a space above a seat portion of the seat and a signal representative of the presence and/or position of the occupant is generated based on the waves received by the transducer. The transducer can be designed to transmit waves into the space above the seat portion of the seat which are also receivable thereby. The transducer may be mounted in a door of the vehicle to enable the distance between the occupant and the door to be determined, i.e., to determine whether the occupant is leaning against the door, and possibly adjacent the airbag module if it is situated in the door. In these cases, deployment of the side airbag can be suppressed. In the alternative the time at which deployment of the side airbag starts, the rate of gas flow into the side airbag, the rate of gas flow out of the side airbag and/or the rate of deployment of the side airbag is/are controlled.

38 Claims, 22 Drawing Sheets

U.S. PATENT DOCUMENTS

| | | | | |
|---|---|---|---|---|
| 3,974,350 | A | | 8/1976 | Breed .......................... 200/61 |
| 4,198,864 | A | | 4/1980 | Breed .......................... 73/492 |
| 4,284,863 | A | | 8/1981 | Breed ...................... 200/61.53 |
| 4,329,549 | A | | 5/1982 | Breed .................. 200/61.45 M |
| 4,573,706 | A | | 3/1986 | Breed .......................... 280/734 |
| 4,683,373 | A | | 7/1987 | Tupman ...................... 180/272 |
| 4,900,880 | A | | 2/1990 | Breed .................. 200/61.45 M |
| 4,933,515 | A | | 6/1990 | Behr et al. ............ 200/61.45 M |
| 4,995,639 | A | * | 2/1991 | Breed .......................... 280/735 |
| 5,071,160 | A | * | 12/1991 | White et al. ................. 280/735 |
| 5,074,583 | A | * | 12/1991 | Fujita et al. ................. 280/735 |
| 5,118,134 | A | | 6/1992 | Mattes ......................... 280/735 |
| 5,222,761 | A | * | 6/1993 | Kaji et al. ................... 280/735 |
| 5,322,323 | A | * | 6/1994 | Ohno et al. .................. 280/735 |
| 5,330,226 | A | | 7/1994 | Gentry et al. ................ 280/735 |
| 5,366,241 | A | | 11/1994 | Kithil ........................... 280/735 |
| 5,398,185 | A | | 3/1995 | Omura ......................... 280/735 |
| 5,413,378 | A | | 5/1995 | Steffens, Jr. et al. ......... 280/735 |
| 5,446,661 | A | | 8/1995 | Gioutsos et al. ............. 280/735 |
| 5,454,591 | A | | 10/1995 | Mazur et al. ................. 280/735 |
| 5,474,327 | A | | 12/1995 | Schousek ..................... 280/735 |
| 5,482,314 | A | | 1/1996 | Corrado et al. ............. 280/735 |
| 5,484,166 | A | * | 1/1996 | Mazur et al. ................. 280/735 |
| 5,528,698 | A | | 6/1996 | Kamei et al. ................ 382/100 |
| 5,602,734 | A | | 2/1997 | Kithil .................. 364/424.055 |
| 5,605,348 | A | | 2/1997 | Blackburn et al. .......... 280/735 |
| 5,653,462 | A | * | 8/1997 | Breed et al. ................. 280/735 |
| 5,691,693 | A | | 11/1997 | Kithil ........................... 340/439 |
| 5,699,057 | A | | 12/1997 | Ikeda et al. ................. 340/937 |
| 5,748,473 | A | | 5/1998 | Breed et al. ................... 701/45 |
| 5,758,899 | A | * | 6/1998 | Foo et al. ..................... 280/735 |
| 5,802,479 | A | | 9/1998 | Kithil et al. ................... 701/45 |
| 5,829,782 | A | * | 11/1998 | Breed et al. ................. 280/735 |
| 5,844,486 | A | | 12/1998 | Kithil et al. ................. 340/573 |
| 5,848,802 | A | * | 12/1998 | Breed et al. ................. 280/735 |
| 5,901,978 | A | * | 5/1999 | Breed et al. ................. 280/735 |
| 5,935,182 | A | | 8/1999 | Foo et al. ....................... 701/45 |
| 5,943,295 | A | * | 8/1999 | Varga et al. ................. 280/735 |
| 5,948,031 | A | | 9/1999 | Jinno et al. ................... 701/45 |
| 5,997,033 | A | * | 12/1999 | Gray et al. .................. 280/735 |
| 6,007,095 | A | * | 12/1999 | Stanley ....................... 280/735 |
| 6,014,602 | A | * | 1/2000 | Kithil et al. ................. 280/735 |
| 6,018,693 | A | * | 1/2000 | Blackburn et al. .......... 280/735 |
| 6,020,812 | A | * | 2/2000 | Thompson et al. ......... 280/735 |
| 6,025,783 | A | * | 2/2000 | Steffens, Jr. ................. 280/735 |
| 6,027,138 | A | * | 2/2000 | Tanaka et al. .............. 280/735 |
| 6,029,105 | A | * | 2/2000 | Schweizer ................... 280/735 |
| 6,039,139 | A | * | 3/2000 | Breed et al. ................. 280/735 |
| 6,095,553 | A | * | 8/2000 | Chou et al. .................. 280/735 |
| 6,095,554 | A | * | 8/2000 | Foo et al. .................... 280/735 |

FOREIGN PATENT DOCUMENTS

| | | | |
|---|---|---|---|
| DE | 4023109 | 1/1992 | |
| DE | 0 669 227 | 8/1995 | |
| JP | 60054589 | 3/1985 | |
| JP | 1-197151 | 8/1989 | ................. 180/287 |
| JP | 3-42337 | 2/1991 | ................. 180/273 |
| JP | 3-159838 | 7/1991 | |
| WO | 94/22693 | 10/1994 | ................. 280/735 |
| WO | 95/27635 | 10/1995 | |

OTHER PUBLICATIONS

"A Critique of Single Point Sensing", D. Breed et al., SAE Paper No. 920124, Feb., 1992.

"Vehicle Occupant Position Sensing", D. Breed, W. DuVall and V. Castelli, SAE Paper No. 940527, Feb., 1994.

"Learned Classification of Sonar Targets Using a Massively Parallel Network", R.P. Gorman and T.J. Sejnowski, IEEE Transactions on Acoustics, Speech and Signal Processing, vol. 36, No. 7, Jul. 1988.

"Analysis of Hidden Units in a Layered Network Trained to Classify Sonar Targets", R.P. Gorman and T.J. Sejnowski, Neural Networks, vol. 1, pp. 75–89, 1988.

"Mechanism of Injury From Air Bag Deployment Loads", Lau et al., Accid. Anal. & Prev., vol. 25, No. 1, pp. 29–45, 1993.

* cited by examiner

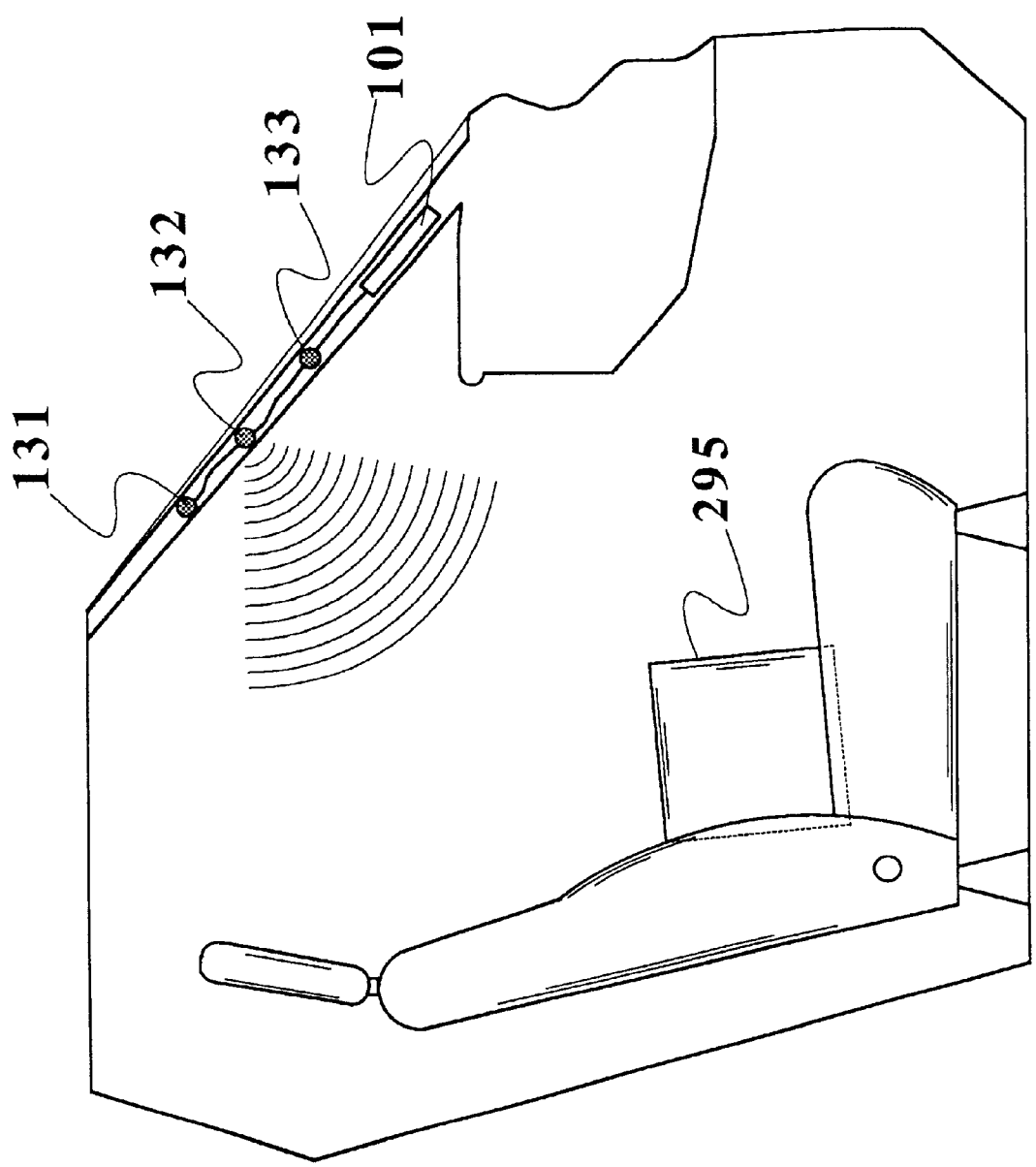

METHOD AND APPARATUS FOR CONTROLLING DEPLOYMENT OF A SIDE AIRBAG

CROSS REFERENCE TO RELATED APPLICATIONS

This application is a continuation-in-part of U.S. patent application Ser. No. 09/047,703 filed Mar. 25, 1998 which in turn is: 1) a continuation-in-part of U.S. patent application Ser. No. 08/640,068 filed Apr. 30, 1996. now U.S. Pat. No. 5,829,782, which in turn is a continuation application of U.S. patent application Ser. No. 08/239,978 filed May 9, 1994, now abandoned, which in turn is a continuation-in-part of U.S. patent application Ser. No. 08/040,978 filed Mar. 31, 1993, now abandoned, which in turn is a continuation-in-part of U.S. patent application Ser. No. 07/878,571 filed May 5, 1992; and 2) a continuation-in-part of U.S. patent application Ser. No. 08/905,876 filed Aug. 4, 1997, now U.S. Pat. No. 5,848,802, which in turn is a continuation of U.S. patent application Ser. No. 08/505,036 filed Jul. 21, 1995, now U.S. Pat. No. 5,653,462, which in turn is a continuation of the '978 application which in turn is a continuation-in-part of the '571 application.

This application is also related to U.S. patent application Ser. No. 09/084,641 filed May 26, 1998, now U.S. Pat. No. 5,901,978, U.S. patent application Ser. No. 09/047,704 filed Mar. 25, 1998 and U.S. patent application Ser. No. 09/409,625 filed Oct. 1, 1999.

BACKGROUND OF THE INVENTION

In 1984, the National Highway Traffic Safety Administration (NHTSA) of the U.S. Department of Transportation issued a requirement for frontal crash protection of automobile occupants. This regulation mandated "passive occupant restraints" for all passenger cars by 1992. A more recent regulation requires both driver and passenger side airbags on all passenger cars and light trucks by 1998. In addition, the demand for airbags is accelerating in both Europe and Japan and it is expected that, within a few years, all vehicles produced in these areas (36 million vehicles) and eventually worldwide (50 million vehicles) will be equipped with airbags as standard equipment.

Whereas thousands of lives have been saved by airbags, significant improvements can be made. As discussed in detail in U.S. Pat. No. 5,653,462 cross-referenced above, and included herein by reference, for a variety of reasons, vehicle occupants can be or get too close to the airbag before it deploys and can be seriously injured or killed upon deployment of the airbag.

Also, a child in a rear facing child seat, which is placed on the right front passenger seat, is in danger of being seriously injured if the passenger airbag deploys. This has now become an industry-wide concern and the U.S. automobile industry is urgently searching for an easy, economical solution, which will prevent the deployment of the passenger side airbag if a rear facing child scat is present. An improvement on the invention disclosed in the above-referenced patent, as will be disclosed in greater detail below, includes more sophisticated means to identify objects within the passenger compartment and will solve this problem.

Initially, these systems will solve the out-of-position occupant and the rear facing child seat problems related to current airbag systems and prevent unneeded deployments when a seat is unoccupied. Airbags are now under development to protect rear seat occupants in vehicle crashes. A system will therefore be needed to detect the presence of occupants, position, i.e., determine if they are out-of-position, and type, e.g., to identify the presence of a rear facing child seat in the rear seat. Future automobiles can be expected to have eight or more airbags as protection is sought for rear seat occupants and from side impacts. In addition to eliminating the disturbance of unnecessary airbag deployments, the cost of replacing these airbags will be excessive if they all deploy in an accident. The improvements described below minimize this cost by not deploying an airbag for a seat, which is not occupied by a human being. An occupying item of a seat may be a living occupant such as a human being or dog, another living organism such as a plant, or an inanimate object such as a box or bag of groceries.

A device to monitor the vehicle interior and identify its contents is needed to solve these and many other problems. For example, once a Vehicle Interior Identification and Monitoring System (VIMS) for identifying and monitoring the contents of a vehicle is in place, many other products become possible including the following:

Inflators and control systems now exist which will adjust the amount of gas flowing into or out of the airbag to account for the size and position of the occupant and for the severity of the accident. The vehicle identification and monitoring system of this invention will control such systems based on the presence and position of vehicle occupants or of a rear facing child seat.

Side impact airbag systems began appearing on 1995 vehicles. The danger of deployment induced injuries will exist for side impact airbags as they now do for frontal impact airbags. A child with his head against the airbag is such an example. The system of this invention will minimize such injuries.

Future vehicles may be provided with a standard cellular phone as well as the Global Positioning System (GPS), an automobile navigation or location system, which is now available on at least one vehicle model. In the event of an accident, the phone may automatically call 911 for emergency assistance and report the exact position of the vehicle. If the vehicle also has a system as described below for monitoring each seat location, the number and perhaps the condition of the occupants could also be reported. In that way, the emergency service (EMS) would know what equipment and how many ambulances to send to the accident site.

Vehicle entertainment system engineers have stated that the quality of the sound in the vehicle could be improved if the number, size and location of occupants and other objects were known. This information can be provided by the vehicle interior identification and monitoring system of this invention.

Similarly to the entertainment system, the heating, ventilation and air conditioning system (HVAC) could be improved if the number, attributes and location of vehicle occupants were known. This can be used to provide a climate control system tailored to each occupant, for example, or the system can be turned off for certain seat locations if there are no occupants present at those locations.

In some cases, the position of a particular part of the occupant is of interest such as: (a) his hand or arm and whether it is in the path of a closing window so that the motion of the window needs to be stopped; (b) the position of the shoulder so that the seat belt anchorage point can be adjusted for the best protection of the occupant; or, (c) the position of the rear of the occupants head so that the headrest can be adjusted to minimize whiplash injuries in rear impacts.

The above applications illustrate the wide range of opportunities, which become available if the identity and location of various objects and occupants, and some of their parts, within the vehicle were known. Once the system is operational, it would be logical for the system to also incorporate the airbag electronic sensor and diagnostics system (SDM) since it needs to interface with SDM anyway and since they could share computer capabilities which will result in a significant cost saving to the auto manufacturer. For the same reasons, it would be logical for VIMS to include the side impact sensor and diagnostic system. As the VIMS improves to where such things as the exact location of the occupants ears and eyes can be determined, even more significant improvements to the entertainment system become possible through the use of noise canceling sound, and the rear view mirror can be automatically adjusted for the driver's eye location. Another example involves the monitoring of the driver's behavior over time which can be used to warn a driver if he or she is falling asleep, or to stop the vehicle if the driver loses the capacity to control it.

Using an advanced VIMS, as explained below, the position of the driver's eyes can be accurately determined and portions of the windshield can be selectively darkened to eliminate the glare from the sun or oncoming vehicle headlights. This system uses electro-chromic glass, a liquid crystal coating on the glass, or other appropriate technology, and detectors to detect the direction of the offending light source. In addition to eliminating the glare, the sun visor can now also be eliminated.

The present invention adds more sophisticated pattern recognition capabilities such as fuzzy logic systems, neural network systems or other pattern recognition computer based algorithms to the occupant position measurement system disclosed in the above referenced copending patent application and greatly extends the areas of application of this technology. An example of such a pattern recognition system using neural networks using sonar is discussed in two papers by Gorman, R. P. and Sejnowski, T. J. "Analysis of Hidden Units in a Layered Network Trained to Classify Sonar Targets", *Neural Networks*, Vol.1. pp. 75–89, 1988, and "Learned Classification of Sonar Targets Using a Massively Parallel Network", IEEE Transactions on Acoustics, Speech, and Signal Processing, Vol. 36, No. 7, July 1988.

"Pattern recognition" as used herein will mean any system which processes a signal that is generated by an object, or is modified by interacting with an object, in order to determine which one of a set of classes that the object belongs to. Such a system might determine only that the object is or is not a member of one specified class, or it might attempt to assign the object to one of a larger set of specified classes, or find that it is not a member of any of the classes in the set. The signals processed are generally electrical signals coming from transducers which are sensitive to either acoustic or electromagnetic radiation and if electromagnetic, they can be either visible light, infrared, ultraviolet, radar or other part of the electromagnetic spectrum.

"To identify" as used herein will mean to determine that the object belongs to a particular set or class. The class may be one containing all rear facing child seats, one containing all human occupants, all human occupants not sitting in a rear facing child seat, or all humans in a certain height or weight range depending on the purpose of the system. In the case where a particular person is to be recognized, the set or class will contain only a single element, the person to be recognized.

Some examples follow:

In a passive infrared system a detector receives infrared radiation from an object in its field of view, in this case the vehicle occupant, and determines the temperature of the occupant based on the infrared radiation. The VIMS can then respond to the temperature of the occupant, which can either be a child in a rear facing child seat or a normally seated occupant, to control some other system. This technology could provide input data to a pattern recognition system but it has limitations related to temperature. The sensing of the child could pose a problem if the child is covered with blankets. It also might not be possible to differentiate between a rear facing child seat and a forward facing child seat. In all cases, the technology will fail to detect the occupant if the ambient temperature reaches body temperature as it does in hot climates. Nevertheless, for use in the control of the vehicle climate, for example, a passive infrared system that permits an accurate measurement of each occupant's temperature is useful.

In a laser optical system an infrared laser beam is used to momentarily illuminate an object, occupant or child seat in the manner as described, and illustrated in FIG. 8, of U.S. Pat. No. 5,653,462 cross-referenced above. In some cases, a charge-coupled device (a type of TV camera also referred to as a CCD array) or a CMOS device is used to receive the reflected light. The laser can either be used in a scanning mode, or, through the use of a lens, a cone of light can be created which covers a large portion of the object. Also triangulation can be used in conjunction with an offset scanning laser to determine the range of the illuminated spot from the light detector. In each case, a pattern recognition system, as defined above, is used to identify and classify, and can be used to locate, the illuminated object and its constituent parts. This system provides the most information about the object and at a rapid data rate. Its main drawback is cost which is considerably above that of ultrasonic or passive infrared systems. As the cost of lasers comes down in the future, this system will become more competitive. Depending on the implementation of the system, there may be some concern for the safety of the occupant if the laser light can enter the occupant's eyes. This is minimized if the laser operates in the infrared spectrum.

Radar systems have similar properties to the laser system discussed above. The wavelength of a particular radar system can limit the ability of the pattern recognition system to detect object features smaller than a certain size. Once again, however, there is some concern about the health effects of radar on children and other occupants. This concern is expressed in various reports available from the United States Food and Drug Administration Division of Devices. Naturally, electromagnetic waves from other parts of the electromagnetic spectrum could also be used such as, for example, those used with what are sometimes referred to as capacitive sensors, e.g., as described in U.S. patents by Kithil et al. U.S. Pat. Nos. 5,366,241, 5,602,734, 5,691,693, 5,802,479 and 5,844,486 and by Jinno et al. U.S. Pat. No. 5,948,031 which are included herein by reference. The ultrasonic system is the least expensive and potentially provides less information than the laser or radar systems due to the delays resulting from the speed of sound and due to the wave length which is considerably longer than the laser systems. The wavelength limits the detail, which can be seen by the system. In spite of these limitations, as shown below, ultrasonics can provide sufficient timely information to permit the position and velocity of an occupant to be accurately known and, when used with an appropriate pattern recognition system, it is capable of positively determining the presence of a rear facing child seat. One pattern recognition system which has been used to identify a rear facing child seat uses neural networks and is similar to that described in the above referenced papers by Gorman et al.

A focusing system, such as used on some camera systems, could be used to determine the initial position of an occupant but is too slow to monitor his position during a crash. This is a result of the mechanical motions required to operate the lens focusing system. By itself it cannot determine the presence of a rear facing child seat or of an occupant but when used with a charge-coupled device plus some infrared illumination for night vision, and an appropriate pattern recognition system, this becomes possible.

From the above discussion, it can be seen that the addition of sophisticated pattern recognition means to any of the standard illumination and/or reception technologies for use in a motor vehicle permits the development of a host of new products, systems or capabilities heretofore not available and as described in more detail below.

OBJECTS AND SUMMARY OF THE INVENTION

The claimed inventions are methods and arrangements for controlling deployment of a side airbag from an airbag module in a crash in which the presence and/or position of an occupant in a passenger compartment of the vehicle is determined and the deployment is controlled based thereon. The deployment can be suppressed if no occupant is present, or if the seat is occupied by, e.g., a rear-facing child seat, and a child leaning against the door.

Principle objects and advantages of this invention, or other disclosed inventions, are:

1. To recognize the presence of a human on a particular seat of a motor vehicle and to use this information to affect the operation of another vehicle system such as the airbag system, heating and air conditioning system, or entertainment system, among others.

2. To recognize the presence of a human on a particular seat of a motor vehicle and then to determine his/her position and to use this position information to affect the operation of another vehicle system.

3. To recognize the presence of a human on a particular seat of a motor vehicle and then to determine his/her velocity relative to the passenger compartment and to use this velocity information to affect the operation of another vehicle system.

4. To determine the position of a seat in the vehicle using sensors remote from the seat and to use that information in conjunction with a memory system and appropriate actuators to position the seat to a predetermined location.

5. To determine the position, velocity or size of an occupant in a motor vehicle and to utilize this information to control the rate of gas generation, or the amount of gas generated, by an airbag inflater system or otherwise control the flow of gas into or out of an airbag.

6. To determine the fact that an occupant is not restrained by a seatbelt and therefore to modify the characteristics of the airbag system. This determination can be done either by monitoring the position of the occupant or through the use of a resonating device placed on the shoulder belt portion of the seatbelt.

7. To determine the presence and/or position of rear seated occupants in the vehicle and to use this information to affect the operation of a rear seat protection airbag for frontal impacts.

8. To determine the presence and/or position of occupants relative to the side impact airbag systems and to use this information to affect the operation of a side impact protection airbag system.

9. To determine the openness of a vehicle window and to use that information to affect another vehicle system.

10. To determine the presence of an occupant's hand or other object in the path of a closing window and to affect the window closing system.

11. To remotely determine the fact that a vehicle door is not tightly closed using an illumination transmitting and receiving system such as one employing electromagnetic or acoustic waves.

12. To determine the position of the shoulder of a vehicle occupant and to use that information to control the seatbelt anchorage point.

13. To determine the position of the rear of an occupant's head and to use that information to control the position of the headrest.

14. To recognize the presence of a rear facing child seat on a particular seat of a motor vehicle and to use this information to affect the operation of another vehicle system such as the airbag system.

15. To determine the total number of occupants of a vehicle and in the event of an accident to transmit that information, as well as other information such as the condition of the occupants, to a receiver remote from the vehicle.

16. To affect the vehicle entertainment system based on a determination of the size or location of various occupants or other objects within the vehicle passenger compartment.

17. To affect the vehicle heating, ventilation and air conditioning system based on a determination of the number, size and location of various occupants or other objects within the vehicle passenger compartment.

18. To determine the temperature of an occupant based on infrared radiation coming from that occupant and to use that information to control the heating, ventilation and air conditioning system.

19. To provide a vehicle interior monitoring system for determining the location of occupants within the vehicle and to include within the same system various electronics for controlling an airbag system.

20. To determine the approximate location of the eyes of a driver and to use that information to control the position of the rear view mirrors of the vehicle.

21. To monitor the position of the head of the vehicle driver and determine whether the driver is falling asleep or otherwise impaired and likely to lose control of the vehicle and to use that information to affect another vehicle system.

22. To monitor the position of the eyelids of the vehicle driver and determine whether the driver is falling asleep or otherwise impaired and likely to lose control of the vehicle and to use that information to affect another vehicle system.

23. To determine the location of the eyes of a vehicle occupant and the direction of a light source such as the headlights of an oncoming vehicle or the sun and to cause a filter to be placed in such a manner as to reduce the intensity of the light striking the eyes of the occupant.

24. To determine the location of the eyes of a vehicle occupant and the direction of a light source such as the headlights of a rear approaching vehicle or the sun and to cause a filter to be placed in such a manner as to reduce the intensity of the light reflected from the rear view mirrors and striking the eyes of the occupant.

25. To determine the location of the ears of a vehicle occupant and to use that information to control the entertainment system so as to improve the quality of the sound reaching the occupant's ears through such methods as noise canceling sound.

26. To recognize a particular driver based on such factors as physical appearance or other attributes and to use this information to control another vehicle system such as a security system, seat adjustment, or maximum permitted vehicle velocity, among others.

These and other objects and advantages will become apparent from the following description of the preferred embodiments of the method and arrangement for controlling deployment of a side airbag in accordance with the invention.

One exemplifying embodiment of an arrangement for controlling deployment of a side airbag from an airbag module to protect an occupant in a seat of a vehicle in a crash comprises determining means for determining the position of the occupant or a part thereof, and control means coupled to the determining means for controlling deployment of the side airbag based on the determined position of the occupant or part thereof The determining means may comprise receiver means, e.g., a wave-receiving transducer such as an ultrasonic transducer or an electromagnetic wave receiver (such as a CCD, CMOS or antenna), for receiving waves from a space above a seat portion of the seat and processor means coupled to the receiver means for generating a signal representative of the position of the occupant or part thereof based on the waves received by the receiver means. The determining means can include transmitter means for transmitting waves into the space above the seat portion of the seat which are receivable by the receiver means. The receiver means may be mounted in a door of the vehicle to enable the distance between the occupant and the door to be determined, i.e., to determine whether the occupant is leaning against the door, and possibly adjacent the airbag module if it is situated in the door or elsewhere in the vehicle. The control means are designed to suppress deployment of the side airbag, control the time at which deployment of the side airbag starts, control the rate of gas flow into the side airbag, control the rate of gas flow out of the side airbag and/or control the rate of deployment of the side airbag.

Another arrangement for controlling deployment of a side airbag comprises determining means for determining whether an occupant is present in the seat, and control means coupled to the determining means for controlling deployment of the side airbag based on whether an occupant is present in the seat, e.g., to suppress deployment if the seat is unoccupied. The determining means may comprise receiver means, e.g., a wave-receiving transducer such as an ultrasonic transducer, CCD, CMOS, or antenna, for receiving waves from a space above a seat portion of the seat and processor means coupled to the receiver means for generating a signal representative of the presence or absence of an occupant in the seat based on the waves received by the receiver means. The determining means may optionally include transmitter means for transmitting waves into the space above the seat portion of the seat which are receivable by the receiver means. Further, the determining means may be designed to determine the position of the occupant or a part thereof when an occupant is in the seat in which case, the control means are arranged to control deployment of the side airbag based on the determined position of the occupant or part thereof.

One method for controlling deployment of a side airbag from an airbag module comprising the steps of determining the position of the occupant or a part thereof, and controlling deployment of the side airbag based on the determined position of the occupant or part thereof. The position of the occupant or part thereof is determined as in the arrangement described above.

Another method for controlling deployment of a side airbag comprises the steps of determining whether an occupant is present in the seat, and controlling deployment of the side airbag based on the presence or absence of an occupant in the seat. The presence of the occupant, and optionally position of the occupant or a part thereof, are determined as in the arrangement described above.

Furthermore, the present invention also relates to methods for controlling a system in the vehicle based on an occupying item in which at least a portion of the passenger compartment in which the occupying item is situated is irradiated, radiation from the occupying item are received, e.g., by a plurality of sensors or transducers each arranged at a discrete location, the received radiation is processed by a processor in order to create one or more electronic signals characteristic of the occupying item based on the received radiation, each signal containing a pattern representative and/or characteristic of the occupying item and each signal is then categorized by utilizing pattern recognition means for recognizing and thus identifying the class of the occupying item. The pattern recognition means process each signal into a categorization thereof based on data corresponding to patterns of received radiation stored within the pattern recognition means and associated with possible classes of occupying items of the vehicle. Once the signal(s) is/are categorized, the operation of the system in the vehicle may be affected based on the categorization of the signal(s), and thus based on the occupying item.

If the system in the vehicle is a vehicle communication system, then an output representative of the number of occupants in the vehicle may be produced based on the categorization of the signal(s) and the vehicle communication system thus controlled based on such output. Similarly, if the system in the vehicle is a vehicle entertainment system or heating and air conditioning system, then an output representative of specific seat occupancy may be produced based on the categorization of the signal(s) and the vehicle entertainment or heating and air conditioning system thus controlled based on such output.

In one embodiment designed to ensure safe operation of the vehicle, the attentiveness of the occupying item is determined from the signal(s) if the occupying item is an occupant, and in addition to affecting the system in the vehicle based on the categorization of the signal, the system in the vehicle is affected based on the determined attentiveness of the occupant.

One embodiment of the interior monitoring system in accordance with the invention comprises means for irradiating at least a portion of the passenger compartment in which an occupying item is situated, receiver means for receiving radiation from the occupying item, e.g., a plurality of receivers, each arranged at a discrete location, processor means coupled to the receivers for processing the received radiation from each receiver in order to create a respective electronic signal characteristic of the occupying item based on the received radiation, each signal containing a pattern representative of the occupying item, categorization means coupled to the processor means for categorizing the signals, and output means coupled to the categorization means for affecting at least one other system within the vehicle based on the categorization of the signals characteristic of the occupying item. The categorization means may comprise pattern recognition means for recognizing and thus identifying the class of the occupying item by processing the signals into a categorization thereof based on data corresponding to patterns of received radiation stored within the pattern recognition means and associated with possible classes of occupying items of the vehicle. Each signal may comprise a plurality of data, all of which is compared to the data corresponding to patterns of received radiation stored within the pattern recognition means and associated with possible classes of contents of the vehicle.

In one specific embodiment, the system includes location determining means coupled to the processor means for determining the location of the occupying item, e.g., based on the received radiation such that the output means which are coupled to the location determining means, in addition to affecting the other system based on the categorization of the signals characteristic of the occupying item, affect the system based on the determined location of the occupying item.

In another embodiment to determine the presence or absence of an occupant, the categorization means comprise pattern recognition means for recognizing the presence or absence of an occupying item in the passenger compartment by processing each signal into a categorization thereof signal based on data corresponding to patterns of received radiation stored within the pattern recognition means and associated with possible occupying items of the vehicle and the absence of such occupying items.

All of the above-described methods and apparatus may be used in conjunction with one another and in combination with the methods and apparatus for optimizing the driving conditions for the occupants of the vehicle described herein.

BRIEF DESCRIPTION OF THE DRAWINGS

The following drawings are illustrative of embodiments of the system developed or adapted using the teachings of this invention and are not meant to limit the scope of the invention as encompassed by the claims.

FIG. 8 is a side view with parts cutaway and removed of a vehicle showing the passenger compartment containing a box on the front passenger seat and a preferred mounting location for an occupant and rear facing child seat presence detector.

FIG. 11A is an enlarged view of the section 11A in FIG. 11.

FIG. 12A is an enlarged view of the section designated 12A in FIG. 12.

FIG. 12B is an enlarged view of the section designated 12B in FIG. 12A.

DESCRIPTION OF THE PREFERRED EMBODIMENTS

Figure 1:
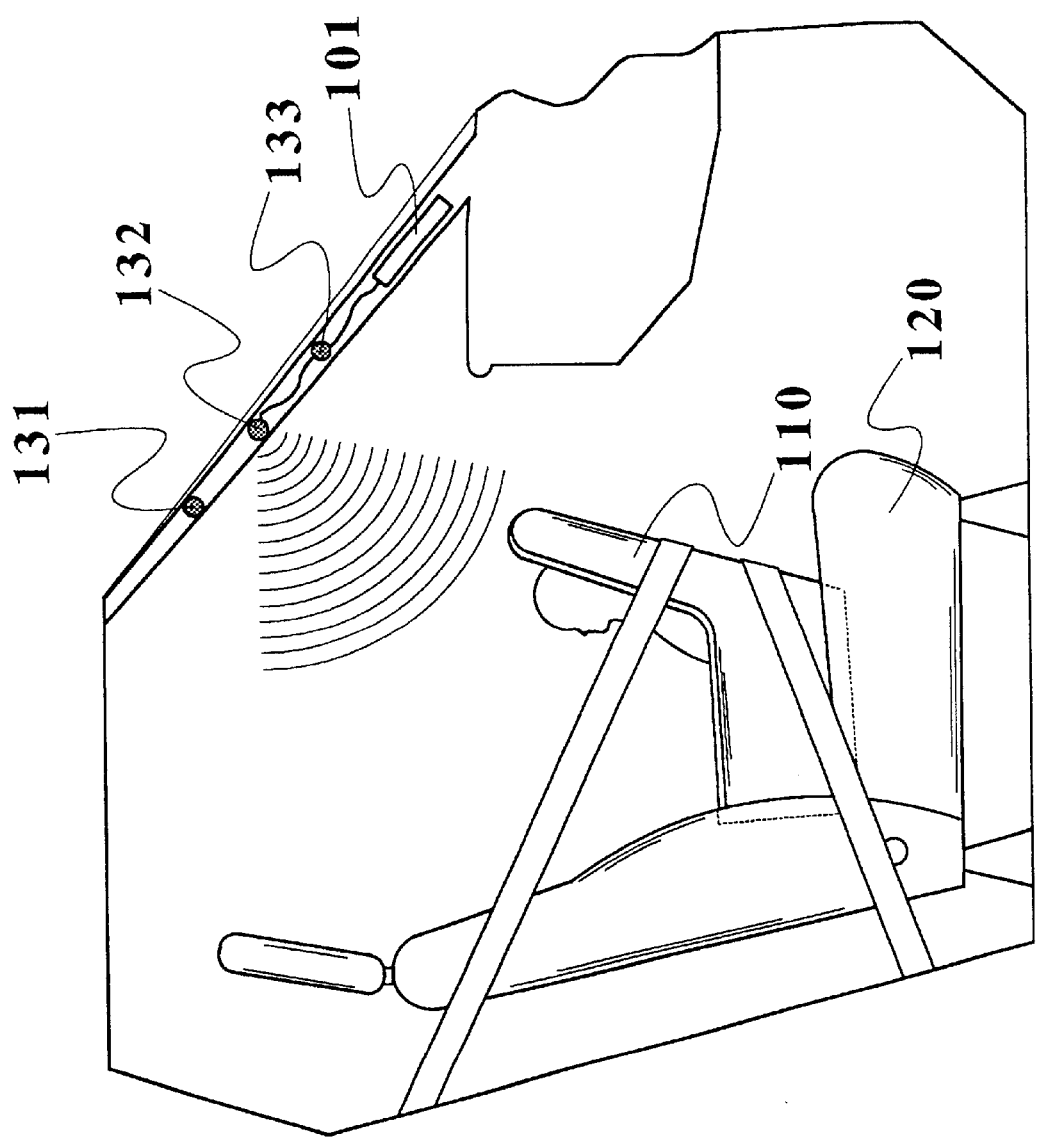
FIG. 1 is a side view with parts cutaway and removed of a vehicle showing the passenger compartment containing a rear facing child seat on the front passenger seat and a preferred mounting location for an occupant and rear facing child seat presence detector.

Referring to the accompanying drawings wherein the same reference numerals refer to the same or similar elements, in FIG. 1 a side view, with parts cutaway and removed, of a vehicle showing the passenger compartment containing a rear facing child seat 110 on a front passenger seat 120 and a preferred mounting location for an occupant and rear facing child seat presence detector in accordance with the invention is illustrated. In this implementation, three ultrasonic transducers 131, 132 and 133 are used in the presence detector in accordance with the invention, although any number of wave-transmitting transducers or radiation-receiving receivers may be used. Such transducers or receivers may be of the type which emit or receive a continuous signal, a time varying signal or a special varying signal such as in a scanning system. One particular type of radiation-receiving receiver for use in the invention is a receiver capable of receiving electromagnetic waves. Transducer 132 transmits ultrasonic energy toward the front passenger seat, which is modified, in this case by the occupying item of the passenger seat, i.e., the rear facing child seat 110, and the modified waves are received by the transducers 131 and 133. Modification of the ultrasonic energy may constitute reflection of the ultrasonic energy as the ultrasonic energy is reflected back by the occupying item of the seat. The waves received by transducers 131 and 133 vary with time depending on the shape of the object occupying the passenger seat, in this case the rear facing child seat 110. Each object will reflect back a signal having a different pattern. Also, the pattern received by transducer 131 will differ slightly from the pattern received by transducer 133 in view of its different mounting location. In some systems, this difference permits the determination of location of the reflecting surface through triangulation. Through the use of two transducers 131,133, a sort of stereographic image is received by the two transducers and recorded for analysis by processor 101, which is coupled to the transducers 131,132,133. This image will differ for each object that is placed on the vehicle seat and it will also change for each position of a particular object and for each position of the vehicle seat.

The "image" recorded from each ultrasonic transducer/ receiver, for ultrasonic systems, is actually a time series of digitized data of the amplitude of the received signal versus time. Since there are two receivers, two time series are obtained which are processed by the processor 101. When different objects are placed on the front passenger seat the two images are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see U.S. Pat. No. 5,943,295 to Varga et. al., which is included herein by reference.

The determination of these rules is central to the pattern recognition techniques used in this invention. In general, three approaches have been useful, artificial intelligence, fuzzy logic and artificial neural networks. In some implementations of this invention, such as the determination that there is an object in the path of a closing window as described below, the rules are sufficiently obvious that a trained researcher can look at the returned acoustic signals and devise a simple algorithm to make the required determinations. In others, such as the determination of the presence of a rear facing child seat or of an occupant, artificial neural networks are used to determine the rules. One such set of neural network software for determining the pattern recognition rules is available from the NeuralWare Corporation of Pittsburgh, Pa.

The system used in a preferred implementation of this invention for the determination of the presence of a rear facing child seat, of an occupant or of an empty seat was the artificial neural network. In this case, the network operates on the two returned signals as sensed by transducers 131 and 133. Through a training session, the system is taught to differentiate between the three cases. This is done by conducting a large number of experiments where all possible child seats are placed in all possible orientations on the front passenger seat. Similarly a sufficiently large number of experiments are run with human occupants and with boxes, bags of groceries and other objects. Sometimes as many as 1,000,000 such experiments are run before the neural network is sufficiently trained so that it can differentiate among the three cases and output the correct decision with a very high probability.

Once the network is determined, it is possible to examine the result using tools supplied by NeuralWare, for example, to determine the rules that were finally arrived at by the trial and error techniques. In that case, the rules can then be programmed into a microprocessor resulting in a fuzzy logic or other rule based system. Alternately, a neural computer can be used to implement the net directly. In either case, the implementation can be carried out by those skilled in the art of pattern recognition. If a microprocessor is used, a memory device is also required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

Figure 2:
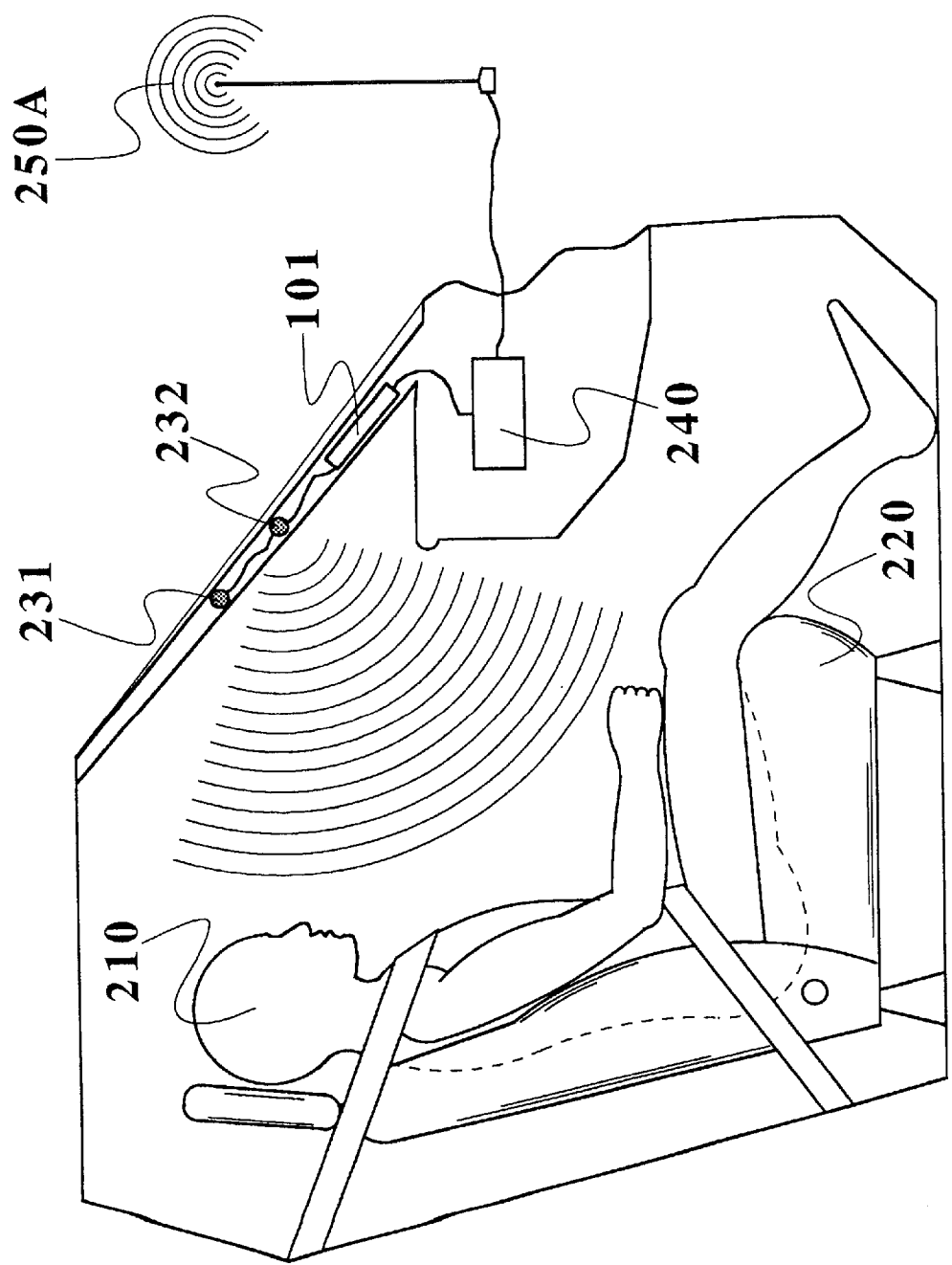
FIG. 2 is a side view with parts cutaway and removed showing schematically the interface between the vehicle interior monitoring system of this invention and the vehicle cellular communication system.

An alternate system is shown in FIG. 2, which is a side view showing schematically the interface between the vehicle interior monitoring system of this invention and the vehicle cellular communication system. In this view, an adult occupant 210 is shown sitting on the front passenger seat 220 and two ultrasonic transducers 231 and 232 are used to determine the presence (or absence) of the occupant on that seat 220. One of the transducers 232 in this case acts as both a transmitter and receiver while transducer 231 acts only as a receiver. Alternately, transducer 231 could serve as both a transmitter and receiver or the transmitting function could be alternated between the two devices. Also, in many cases more that two transmitters and receivers are used and in still other cases other types of sensors, such as weight, seatbelt and seat position sensors, are also used in combination with the radiation sensors. As was also the case in FIG. 1, the transducers 231 and 232 are attached to the vehicle buried in the A-pillar trim, where their presence is disguised, and are connected to processor 101 that is also hidden in the trim. The A-pillar is the roof support pillar that is closest to the front of the vehicle and which, in addition to supporting the roof, also supports the front windshield and the front door. Naturally, other mounting locations can also be used.

The interface between the monitoring system and the cellular, phone system is shown schematically by box 240 that outputs to an antenna 250A. The transducers 231 and 232 in conjunction with the pattern recognition hardware and software, which is implemented in processor 101 and is packaged on a printed circuit board or flex circuit along with the transducers 231 and 232, determine the presence of an occupant within a few seconds after the vehicle is started. Similar systems located to monitor the remaining seats in the vehicle, also determine the presence of occupants at the other seating locations and this result is stored in the computer memory which is part of each monitoring system processor 101. In the event of an accident, the electronic system associated with the cellular phone system interrogates the various interior monitoring system memories and arrives at a count of the number of occupants in the vehicle, and in more sophisticated systems, even makes a determination as to whether each occupant was wearing a seatbelt and if he or she is moving after the accident. The phone system then automatically dials the EMS operator (such as 911) and the information obtained from the interior monitoring systems is forwarded so that a determination can be made as to the number of ambulances and other equipment to send to the accident site. Vehicles having this capability are now in service. Such vehicles will also have a system, such as the global positioning system, which permits the vehicle to determine its exact location and to forward this information to the EMS operator.

The control of the heating, ventilating, and air conditioning (HVAC) system alone would probably not justify the implementation of an interior monitoring system at least until the time comes when electronic heating and cooling systems replace the conventional systems now used. Nevertheless, if the. monitoring system is present, it can be used to control the HVAC for a small increment in cost. The advantage of such a system is that since most vehicles contain only a single occupant, there is no need to direct heat or air conditioning to unoccupied seats. This permits the most rapid heating or cooling for the driver when the vehicle is first started and he is alone without heating or cooling unoccupied seats. Since the HVAC system does consume energy, an energy saving also results by only heating and cooling the driver when he is alone.

Figure 3:
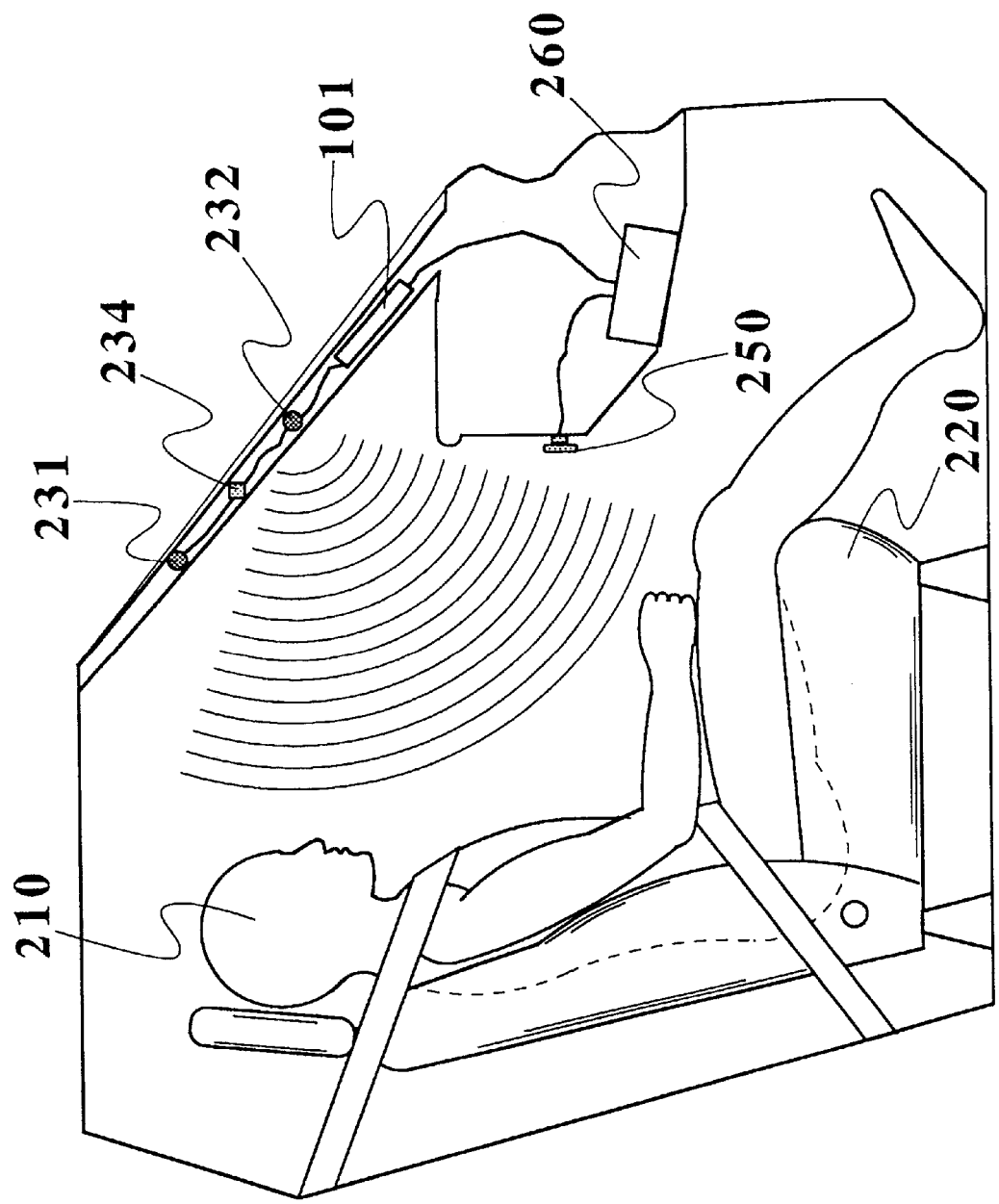
FIG. 3 is a side view with parts cutaway and removed showing schematically the interface between the vehicle interior monitoring system of this invention and the vehicle heating and air conditioning system.

FIG. 3 shows a side view of a vehicle passenger compartment showing schematically an interface 260 between the vehicle interior monitoring system of this invention and the vehicle heating and air conditioning system. In addition to the transducers 231 and 232, which at least in this embodiment are preferably acoustic transducers, an infrared sensor 234 is also shown mounted in the A-pillar and which monitors the temperature of the occupant. The output from each of the transducers is fed into processor 101 that is in turn connected to interface 260. In this manner, the HVAC control is based on the occupant's temperature rather than that of the ambient air in the vehicle, as well as the determined presence of the occupant via transducers 231, 232 as described above. This also permits each vehicle occupant to be independently monitored and the HVAC system to be adjusted for each occupant either based on a set temperature for all occupants or, alternately, each occupant could be permitted to set his own preferred temperature through adjusting a control knob shown schematically as 250 in FIG. 3. Since the monitoring system is already installed in the vehicle with its own associated electronics including processor 101, the infrared sensor can be added with little additional cost and can share the processing unit. Not only can this system be used for directing hot and cold air, but developments in the field of directing sound using hyper-sound now makes it possible to accurately direct sound to the vicinity of the ears of an occupant so that only that occupant can hear the sound. The system of this invention can thus be used to find the proximate direction of the ears of the occupant for this purpose.

Figure 4:
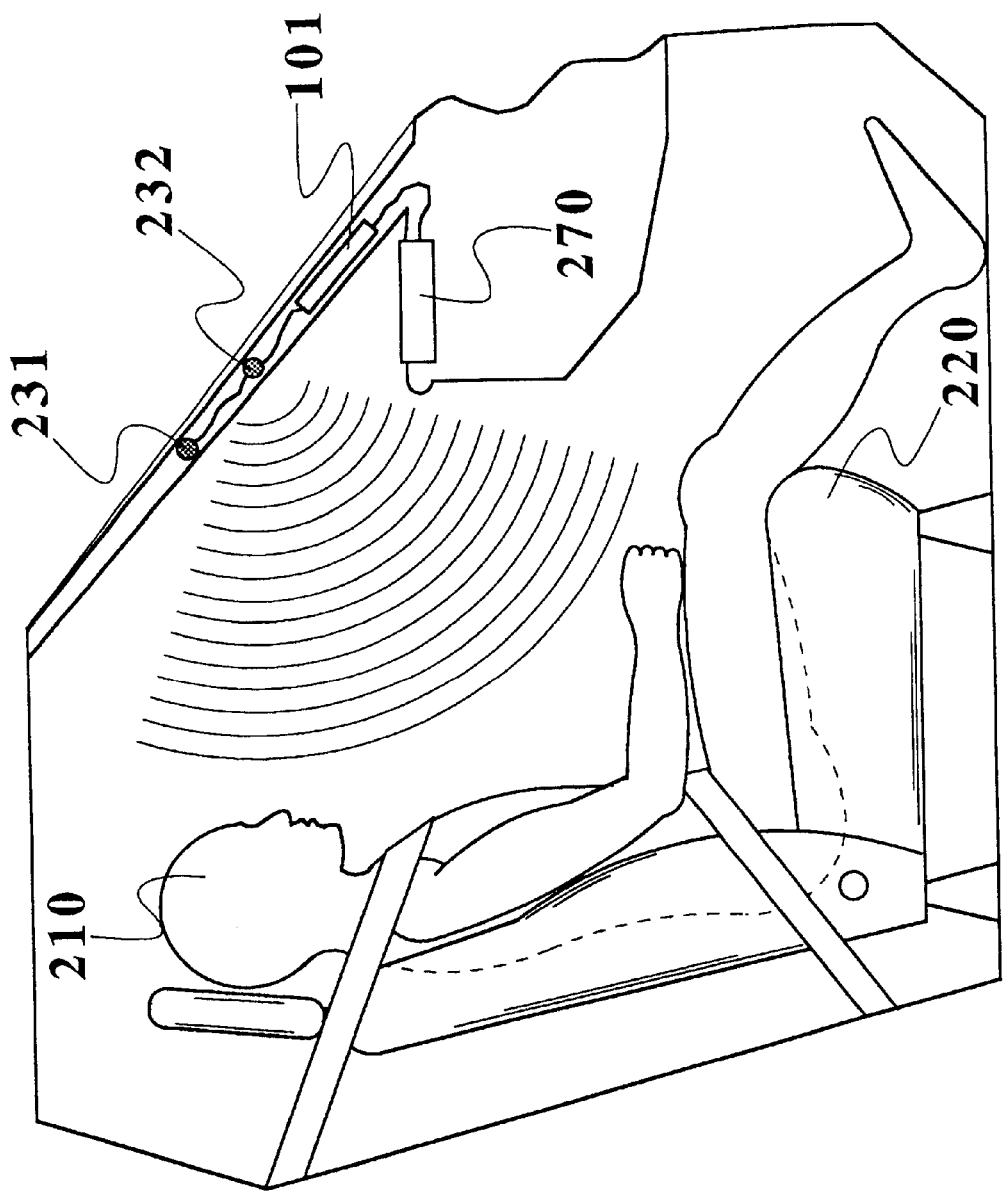
FIG. 4 is a side view with parts cutaway and removed showing schematically the interface between the vehicle interior monitoring system of this invention and the vehicle airbag system.

The use of the vehicle interior monitoring system to control the deployment of an airbag is discussed in detail in U.S. Pat. No. 5,653,462 cross referenced above. In that case, the control is based on the use of a simple pattern recognition system to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of this invention and the vehicle airbag system 270.

In this embodiment, an ultrasonic transducer 232 transmits a burst of ultrasonic waves that travel to the occupant where they are reflected back to transducers or receptors/receivers 231 and 232. The time period required for the waves to travel from the generator and return is used to determine the distance from the occupant to the airbag as described in the aforementioned U.S. Pat. No. 5,653,462, i.e., and thus may also be used to determine the position or location of the occupant. In the case of this invention, however, the portion of the return signal, which represents the occupants head or chest, has been determined based on pattern recognition techniques such as a neural network. The relative velocity of the occupant toward the airbag can then be determined, from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance which would not be possible if he were wearing a seatbelt gives information that he is not wearing one.

A more detailed discussion of this process and of the advantages of the various technologies, such as acoustic or electromagnetic, can be found in SAE paper 940527, "Vehicle Occupant Position Sensing" by Breed et al, which is included herein by reference. In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either laser or radar. The main limiting feature of ultrasonics is the wavelength, which places a limitation on the size of features that can be discerned. Optical systems, for example, are required when the identification of particular individuals is required.

Figure 5:
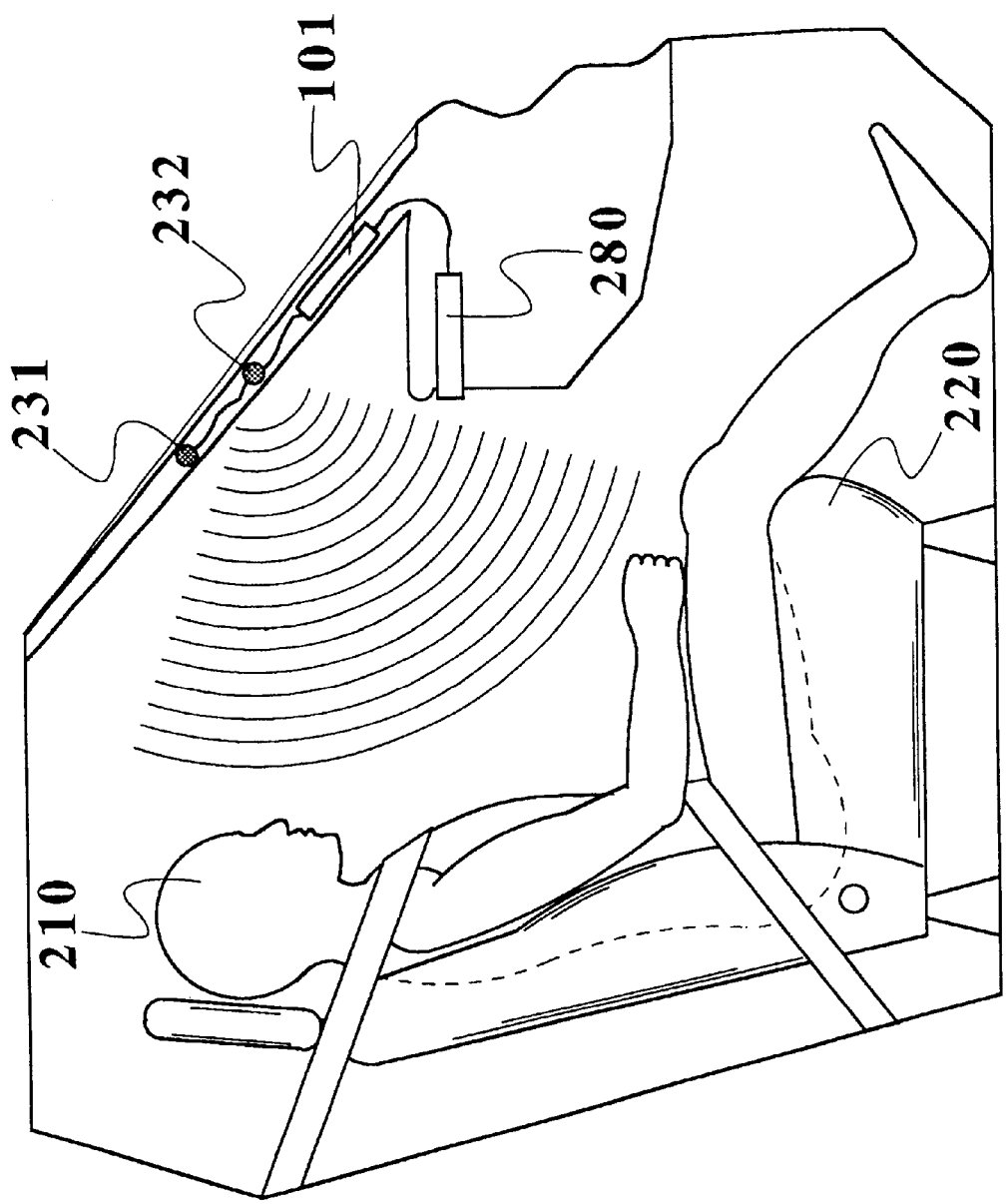
FIG. 5 is a side view with parts cutaway and removed showing schematically the interface between the vehicle interior monitoring system of this invention and the vehicle entertainment system.

It is well known among acoustics engineers that the quality of sound coming from an entertainment system can be substantially affected by the characteristics and contents of the space in which it operates and the surfaces surrounding that space. When an engineer is designing a system for an automobile he has a great deal of knowledge about that space and of the vehicle surfaces surrounding it. He has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved. FIG. 5, therefore, illustrates schematically the interface between the vehicle interior monitoring system of this invention, i.e., transducers 231,232 and processor 101 which operate as set forth above, and the vehicle entertainment system 280. The particular design of the entertainment system that uses the information provided by the monitoring system can be determined by those skilled in the appropriate art. Perhaps in combination with this system, the quality of the sound system can be measured by the audio system itself either by using the speakers as receiving units also or through the use of special microphones. The quality of the sound can then be adjusted according to the vehicle occupancy and the reflectivity of the vehicle occupants. If, for example, certain frequencies are being reflected more that others, the audio amplifier can be adjusted to amplify those frequencies to a lesser amount that others.

Vehicle entertainment system 280 may include means for generating and transmitting sound waves at the cars of the occupants, the position of which are detected by transducers 231,232 and processor 101, as well as means for detecting the presence and direction of unwanted noise. In this manner, appropriate sound waves can be generated and transmitted to the occupant to cancel the unwanted noise and thereby optimize the comfort of the occupant, i.e., the reception of the desired sound from the entertainment system 280.

Figure 6:
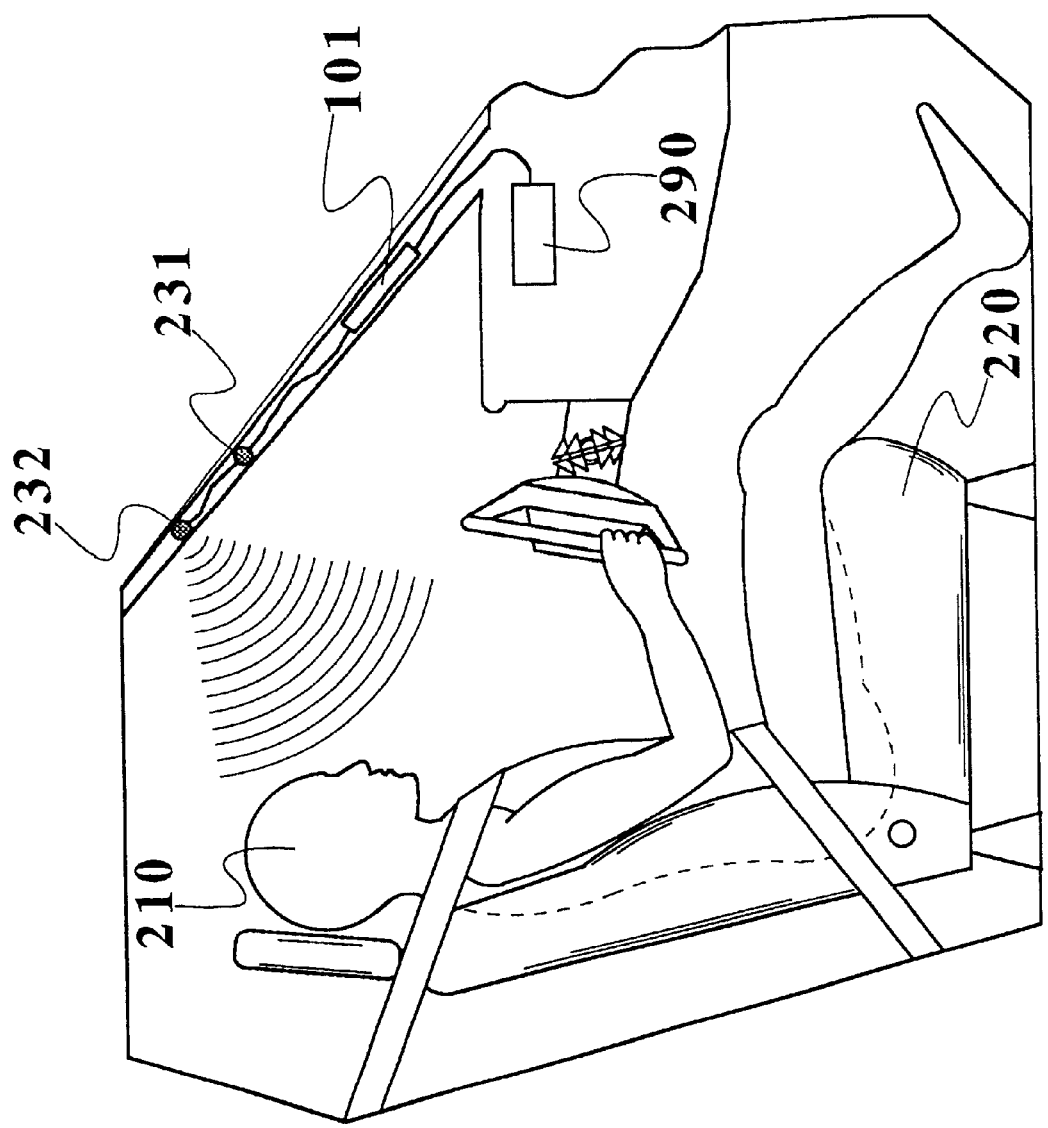
FIG. 6 is a side view with parts cutaway and removed of a vehicle showing the passenger compartment containing a driver and a preferred mounting location for an occupant identification system.

The maximum acoustic frequency that is practical to use for acoustic imaging in the systems is about 40 to 160 kilohertz (kHz). The wavelength of a 50 kHz acoustic wave is about 0.6 cm which is too coarse to determine the fine features of a person's face, for example. It is well understood by those skilled in the art that features which are smaller than the wavelength of the irradiating radiation cannot be distinguished. Similarly the wave length of common radar systems varies from about 0.9 cm (for 33,000 MHz K band) to 133 cm (for 225 MHz P band) which is also too coarse for person identification systems. In FIG. 6, therefore, the ultrasonic transducers of the previous designs are replaced by laser transducers 231 and 232 which are connected to a microprocessor 101. In all other manners, the system operates the same. The design of the electronic circuits for this laser system is described in some detail in U.S. Pat. No. 5,653,462 cross-referenced above and in particular FIG. 8 thereof and the corresponding description. In this case, a pattern recognition system such as a neural network system is employed and uses the demodulated signals from the receptors 231 and 232.

The output of processor 101 of the monitoring system is shown connected schematically to a general interface 290 which can be the vehicle ignition enabling system; the entertainment system; the seat, mirror, suspension or other adjustment systems; or any other appropriate vehicle system.

Figure 7A:
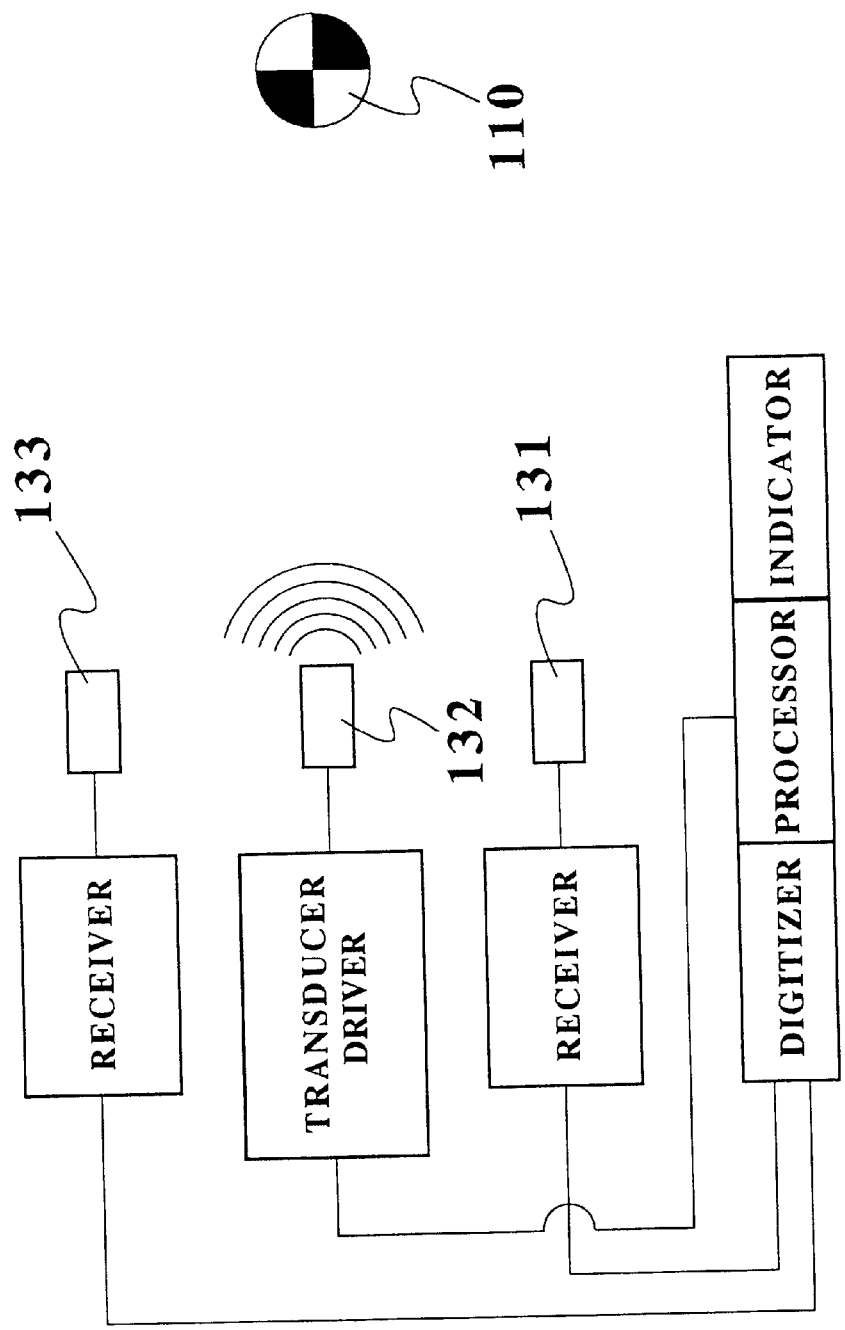
FIG. 7A is a functional block diagram of the ultrasonic imaging system illustrated in FIG. 1 using a microprocessor.
Figure 7B:
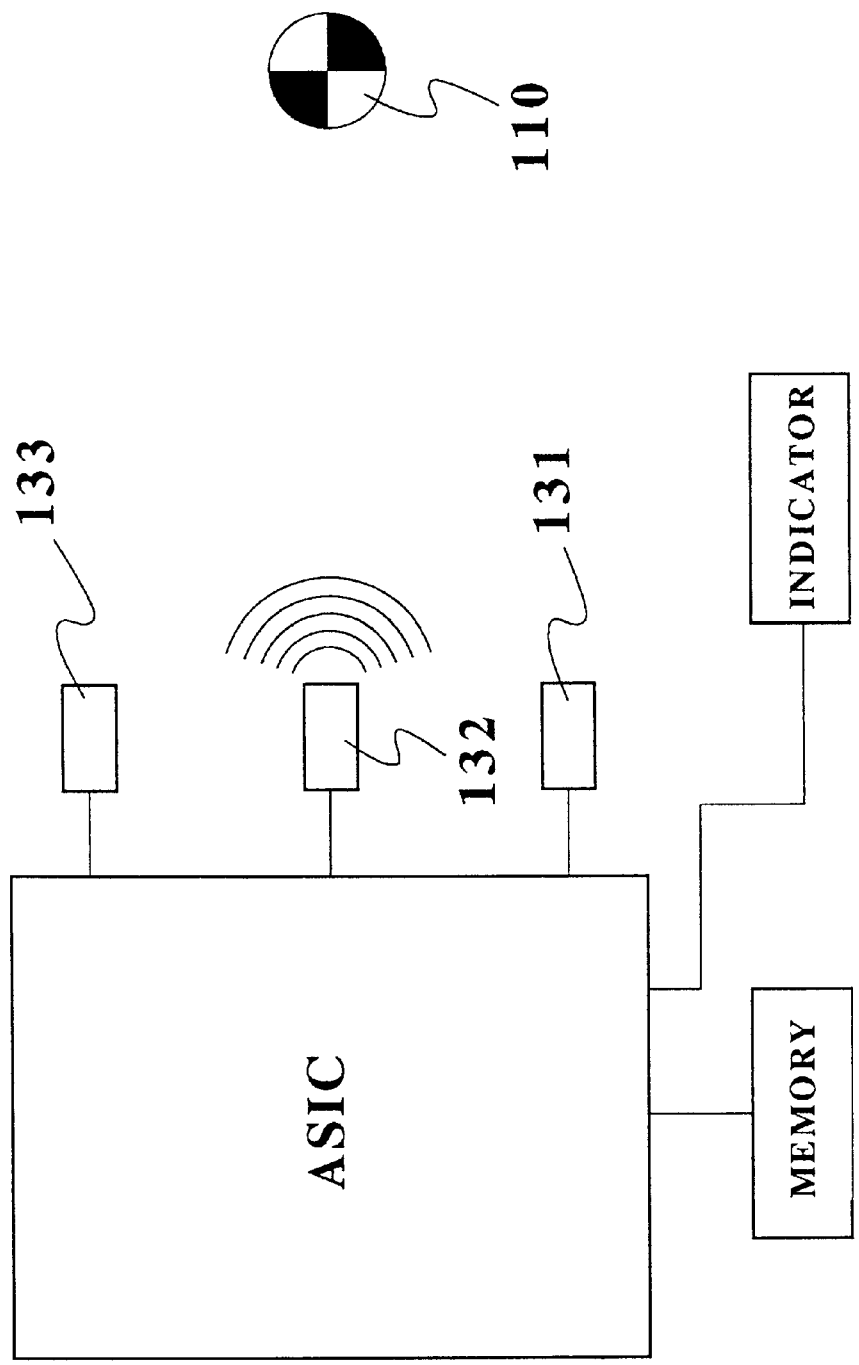
FIG. 7B is a functional block diagram of the ultrasonic imaging system illustrated in FIG. 1 using an application specific integrated circuit (ASIC).

There are two preferred methods of implementing the vehicle interior monitoring system of this invention, a microprocessor system and an application specific integrated circuit system (ASIC). Both of these systems are represented schematically as either 101 or 601 herein. In some systems, both a microprocessor and an ASIC are used. In other systems, most if not all of the circuitry is combined onto a single chip (system on a chip). The particular implementation depends on the quantity to be made and economic considerations. A block diagram illustrating the microprocessor system is shown in FIG. 7A which shows the implementation of the system of FIG. 1. An alternate implementation of the FIG. 1 system using an ASIC is shown in FIG. 7B. In both cases the target, which may be a rear facing child seat, is shown schematically as 110 and the three transducers as 131, 132, and 133. In the embodiment of FIG. 7A, there is a digitizer coupled to the receivers 131,133 and the processor, and an indicator coupled to the processor. In the embodiment of FIG. 7B, there is a memory unit associated with the ASIC and also an indicator coupled to the ASIC.

In FIG. 8, a view of the system of FIG. 1 is illustrated with a box 295 shown on the front passenger seat in place of the rear facing child scat. The vehicle interior monitoring system of this invention is trained to recognize that this box 295 is neither a rear facing child seat nor an occupant and therefore it is treated as an empty seat and the deployment of the airbag is suppressed. This training is accomplished using a neural network with the commercially available software disclosed above and provided, for example, by NeuralWare of Pittsburgh. The system assesses the probability that the box is a person, however, and if there is even the remotest chance that it is a person, the airbag deployment is not suppressed. The system is thus typically biased toward enabling airbag deployment.

Figure 9:
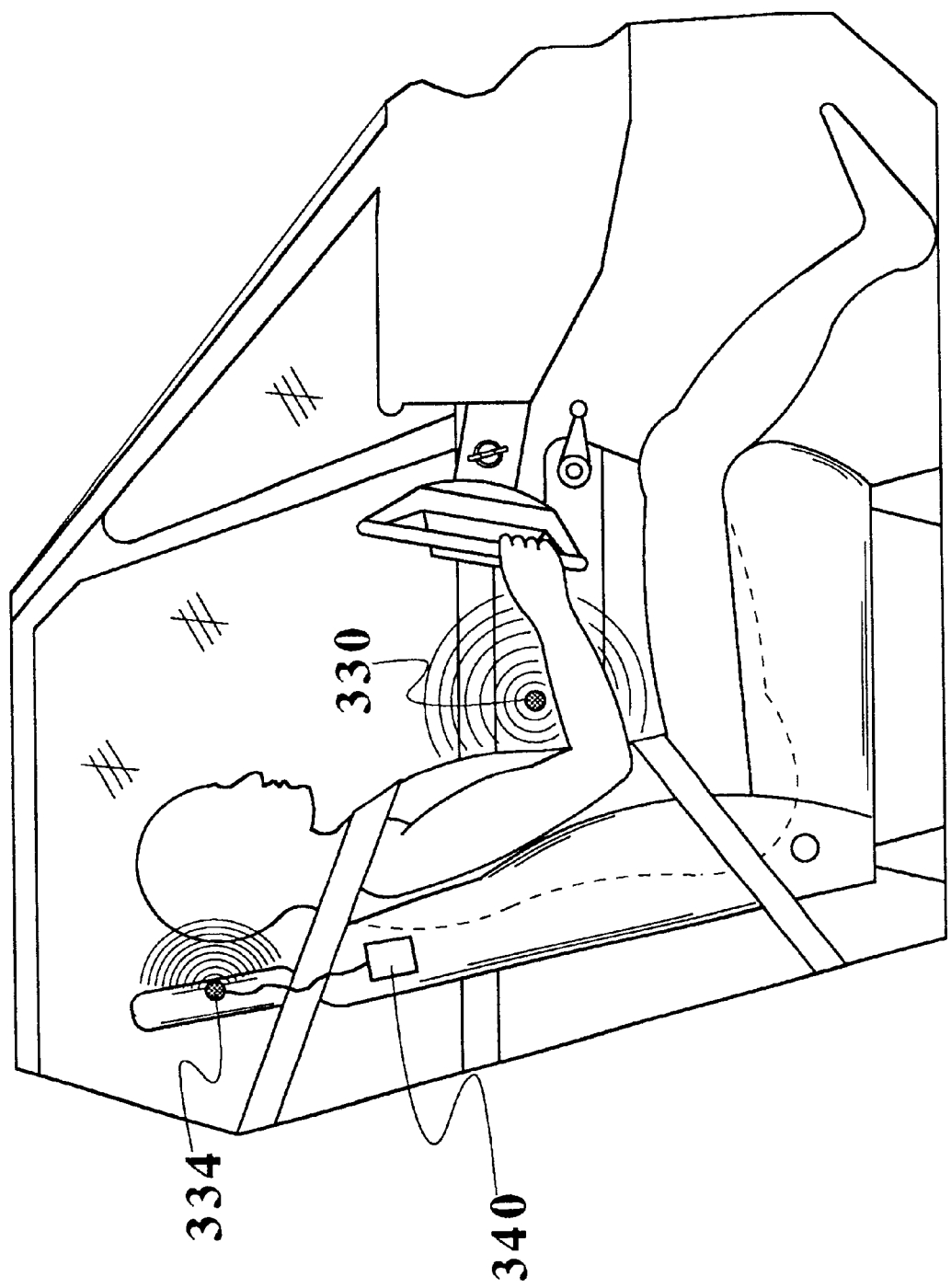
FIG. 9 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

Side impact airbags are now beginning to be used on some vehicles. These initial airbags are quite small compared to the driver or passenger airbags used for frontal impact protection. Nevertheless, a small child could be injured if he is sleeping with his head against the airbag module when the airbag therein deploys and a vehicle interior monitoring system is needed to prevent such a deployment in that event. In FIG. 9, a single ultrasonic transducer 330 is shown mounted in the vehicle door adjacent to the airbag system. This device is not used to identify, the object that is adjacent the airbag but merely to measure the position of the object. It is also understood that it can be used to determine the presence of the object, i.e., the received waves are indicative of the presence or absence of an occupant as well as the position of the occupant or a part thereof. Instead of an ultrasonic transducer, another wave-receiving transducer may be used as described in any of the other embodiments herein, either solely for performing a wave-receiving function or for performing both a wave-receiving function and a wave-transmitting function.

A rear-of-head detector 334 is also illustrated in FIG. 9. This detector 334 is used to determine the distance from the headrest to the rear most position of the occupant's head and to therefore control the position of the headrest so that it is properly positioned behind the occupant's head to offer optimum support in the event of a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Administration, (NHTSA)). A properly positioned headrest could substantially reduce the frequency of such injuries, which can be accomplished by the head detector of this invention. The head detector 334 is shown connected schematically to the headrest control mechanism and circuitry 340. This mechanism is capable of moving the headrest up and down and, in some cases, rotating it fore and aft.

Figure 10:
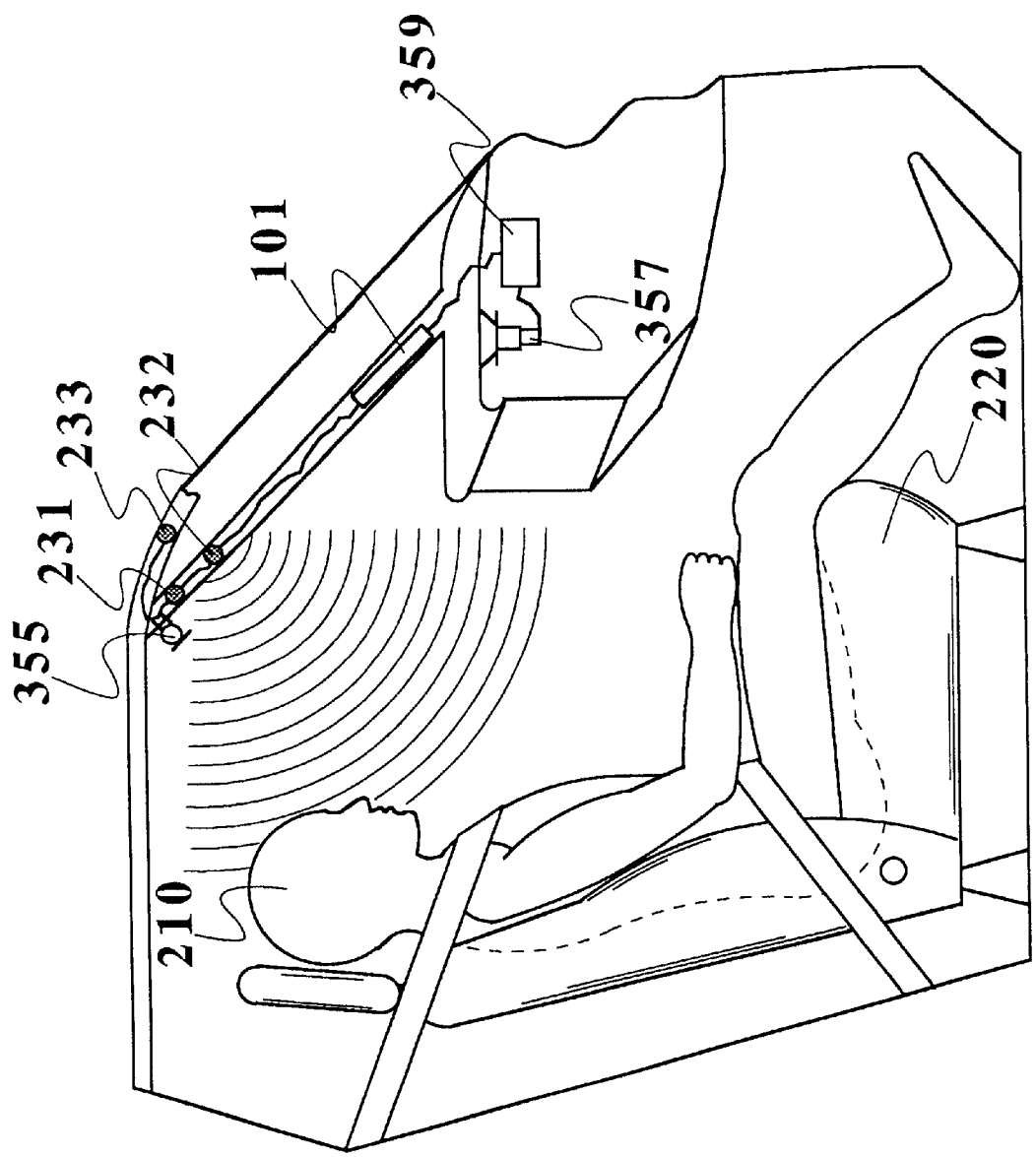
FIG. 10 is a side view w with parts cutaway and removed of a vehicle showing the passenger compartment containing a front passenger and a preferred mounting location for an occupant head detector and a preferred mounting location of an adjustable microphone and speakers.

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of drivers' mouths varies significantly depending on such things as the size and seating position of the driver. By using the vehicle interior identification and monitoring system of this invention, and through appropriate pattern recognition techniques, the location of the driver's head can be determined with sufficient accuracy even with ultrasonics to permit a directional microphone having a 15 degree cone angle to be aimed at the mouth of the driver resulting in a clear reception of his voice. The use of directional speakers in a similar manner also improves the telephone system performance. In the extreme case of directionality, the techniques of hypersound can be used. Such a system can also be used to permit effortless conversations between occupants of the front and rear seats. Such a system is shown in FIG. 10 which is a system similar to that of FIG. 2 only using three ultrasonic transducers 231, 232 and 233 to determine the location of the driver's head and control the pointing direction of a microphone 355. Speaker 357 is shown connected schematically to the phone system 359 completing the system.

The transducers 231 and 232 are placed high in the A-pillar and the third transducer 233 is placed in the headliner and displaced horizontally from transducers 231 and 232. The two transducers 231 and 232 provide information to permit the determination of the locus of the head in the vertical direction and the combination of one of transducers 231 and 232 in conjunction with transducer 233 is used to determine the horizontal location of the head. The three transducers are placed high in the vehicle passenger compartment so that the first returned signal is from the head. Temporal filtering is used to eliminate signals which are reflections from beyond the head and the determination of the head center location is then found by the approximate centroid of the head returned signal. That is, once the location of the return signal centroid is found from each of the three received signals from transducers 231, 232 and 233, the distance to that point is known for each of the transducers based on the time it takes the signal to travel from the bead to each transducer. In this manner, by using the three transducers plus an algorithm for finding the coordinates of the head center, using processor 101, and through the use of known relationships between the location of the mouth and the head center, an estimate of the mouth location, and the ear locations, can be easily determined within a circle having a diameter of about five inches (13 cm). This is sufficiently accurate for a directional microphone to cover the mouth while excluding the majority of unwanted noise.

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. The vehicle interior monitoring system of this invention can contribute to the solution of this problem by determining the position of the driver's eyes. If separate sensors are used to sense the direction of the light from the on-coming vehicle or the sun, and through the use of electro-chromic glass, a liquid crystal film, or other appropriate technology, a portion of the windshield can be darkened to impose a filter between the eyes of the driver and the light source. Electro-chromic glass is a material where the color of the glass can be changed through the application of an electric current. By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development.

Figure 11:
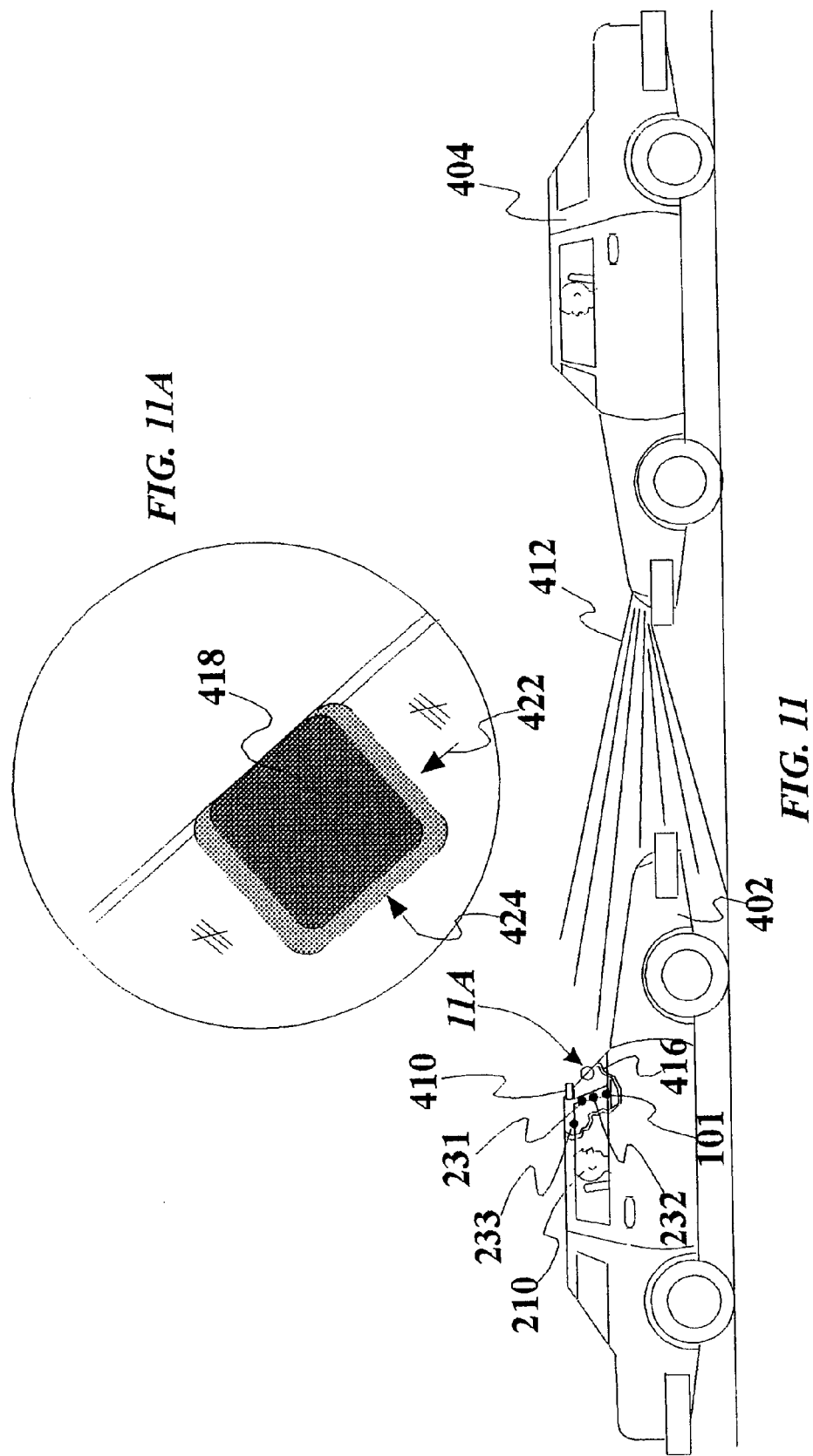
FIG. 11 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electrochromic glass in the windshield.

FIG. 11 illustrates how such a system operates. A sensor 410 located on vehicle 402 determines the direction of the light 412 from the headlights of oncoming vehicle 404. Sensor 410 is comprised of a lens and a charge-coupled device (CCD), of CMOS light sensing or similar device, with appropriate electronic circuitry which determines which elements of the CCD are being most brightly illuminated. An algorithm stored in processor 101 then calculates the direction of the light from the oncoming headlights based on the information from the CCD, or CMOS device. Transducers 231, 232 and 233 determine the probable location of the eyes of the operator 210 of vehicle 402 in a manner such as described above in conjunction with the determination of the location of the driver's mouth in the discussion of FIG. 10. In this case, however, the determination of the probable locus of the driver's eyes is made with an accuracy of a diameter for each eye of about 3 inches (7.5 cm). This calculation sometimes will be in error and provision is made for the driver to make an adjustment to correct for this error as described below.

The windshield 416 of vehicle 402 is made from electro-chromic glass or comprises a liquid crystal film or similar system, and is selectively darkened at area 418 due to the application of a current along perpendicular directions 422 and 424 of windshield 416. The particular portion of the windshield to be darkened is determined by processor 101. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by processor 101. A separate control system, not shown, located on the instrument panel, or at some other convenient location, allows the driver to select the amount of darkening accomplished by the system from no darkening to maximum darkening. In this manner, the driver can select the amount of light that is filtered to suit his particular physiology. The sensor 410 can either be designed to respond to a single light source or to multiple light sources to be sensed and thus multiple portions of the vehicle windshield to be darkened.

As mentioned above, the calculations of the location of the driver's eyes using acoustic systems may be in error and therefore provision must be made to correct for this error. One such system permits the driver to adjust the center of the darkened portion of the windshield to correct for such errors through a knob on the instrument panel, steering wheel or other convenient location. Another solution permits the driver to make the adjustment by slightly moving his head. Once a calculation as to the location of the driver's eyes has been made, that calculation is not changed even though the driver moves his head slightly. It is assumed that the driver will only move his head to center the darkened portion of the windshield to optimally filter the light from the oncoming vehicle. The monitoring system will detect this initial head motion and make the correction automatically for future calculations.

Electro-chromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions which cover the lights from the offending vehicle, the driver is able to see all of the light coming from the rear whether the source is bright or dim. This permits the driver to see all of the approaching vehicles not just the one with bright lights.

Figure 12:
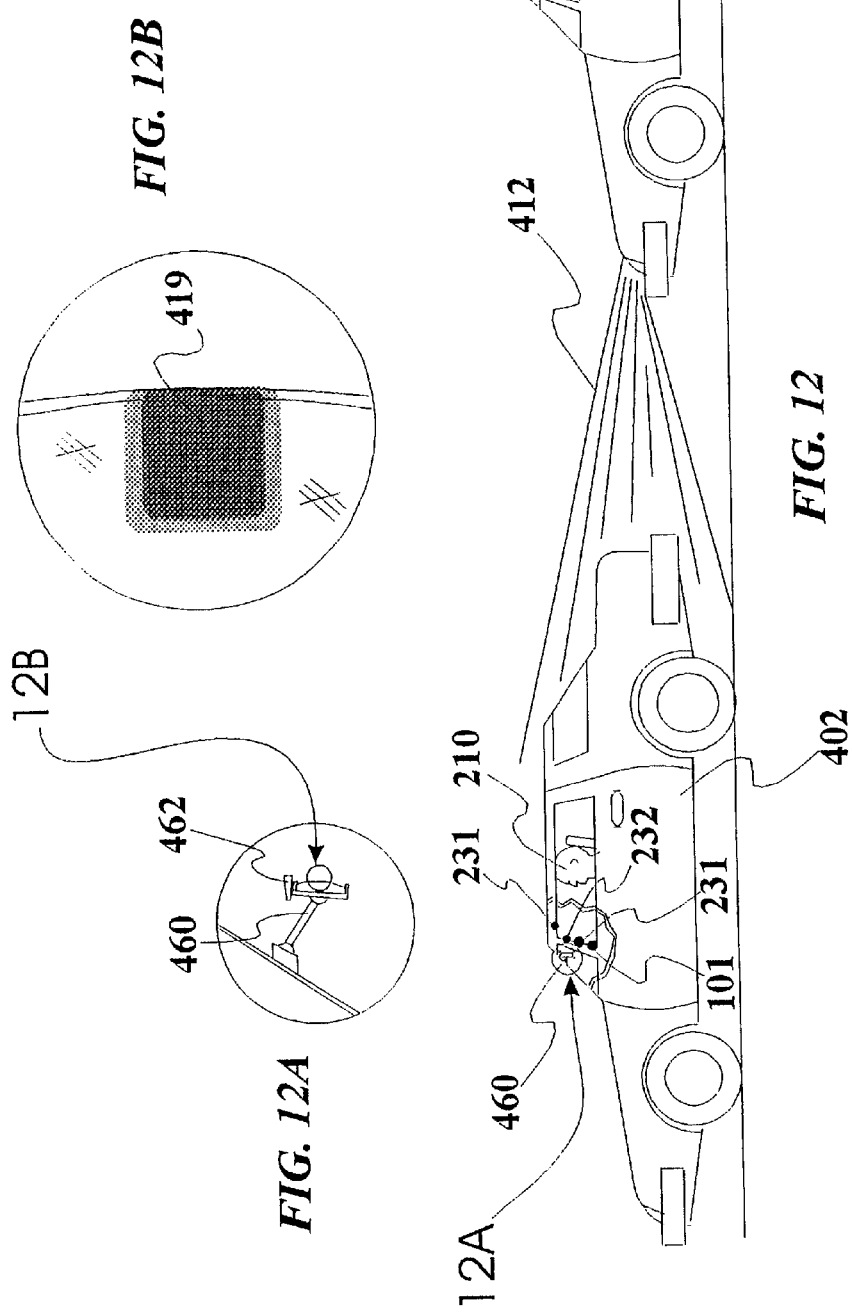
FIG. 12 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass in the rear view mirror.

Such a system is illustrated in FIG. 12 where rear view mirror 460 is equipped with electro-chromic glass, or comprises a liquid crystal film, having the capability of being selectively darkened, e.g., at area 419. Associated with mirror 460 is a light sensor 462 that determines the direction of light 412 from the headlights of rear approaching vehicle 405. In the same manner as above, transducers 231, 232 and 233 determine the location of the eyes of the driver 210. The signals from both sensor systems, 231, 232 plus 233 and 462, are combined in processor 101, where a determination is made as to what portions of the mirror should be darkened, e.g., area 419. Appropriate currents are then sent to the mirror in a manner similar to the windshield system described above.

Figure 13:
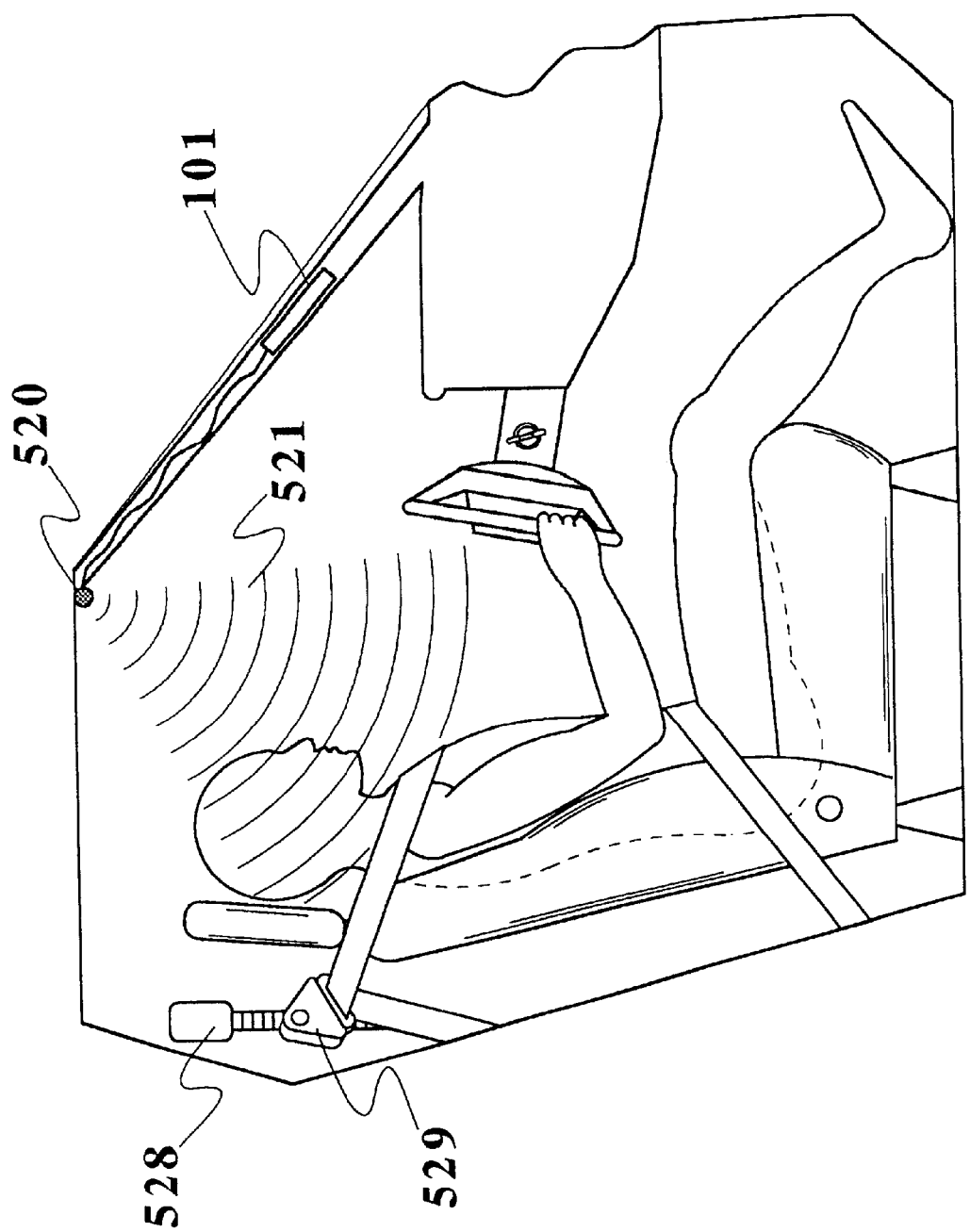
FIG. 13 is a side view with parts cutaway and removed of a vehicle showing the passenger compartment containing a driver, a shoulder height sensor and a seatbelt anchorage adjustment system.

Seatbelts are most effective when the upper attachment point to the vehicle is positioned vertically close to the shoulder of the occupant being restrained. If the attachment point is too low the occupant experiences discomfort from the rubbing of the belt on his shoulder. If it is too high, the occupant may experience discomfort due to the rubbing of the belt against his neck and the occupant will move forward by a greater amount during a crash which may result in his head striking the steering wheel. Women in particular experience discomfort from an improperly adjusted seatbelt anchorage point. For these reasons, it is desirable to have the upper seatbelt attachment point located slightly above the occupant's shoulder. To accomplish this for various sized occupants, the location of the occupant's shoulder must be known which can be accomplished by the vehicle interior monitoring system described herein. Such a system is illustrated in FIG. 13 that is a side view of a seatbelt anchorage adjustment system. In this system, a transmitter and receiver (transducer) 520 is positioned in a convenient location, such as the headliner, located above and to the outside of the occupant's shoulder. A narrow elliptical beam 521 of energy is transmitted from transducer 520 in a manner such that it irradiates or illuminates the occupant's shoulder and headrest. An appropriate pattern recognition system as described above is then used to determine the location and position of the shoulder. This information is fed to the seatbelt anchorage height adjustment system 528, shown schematically, which moves the attachment point 529 to the optimum vertical location.

Figure 14:
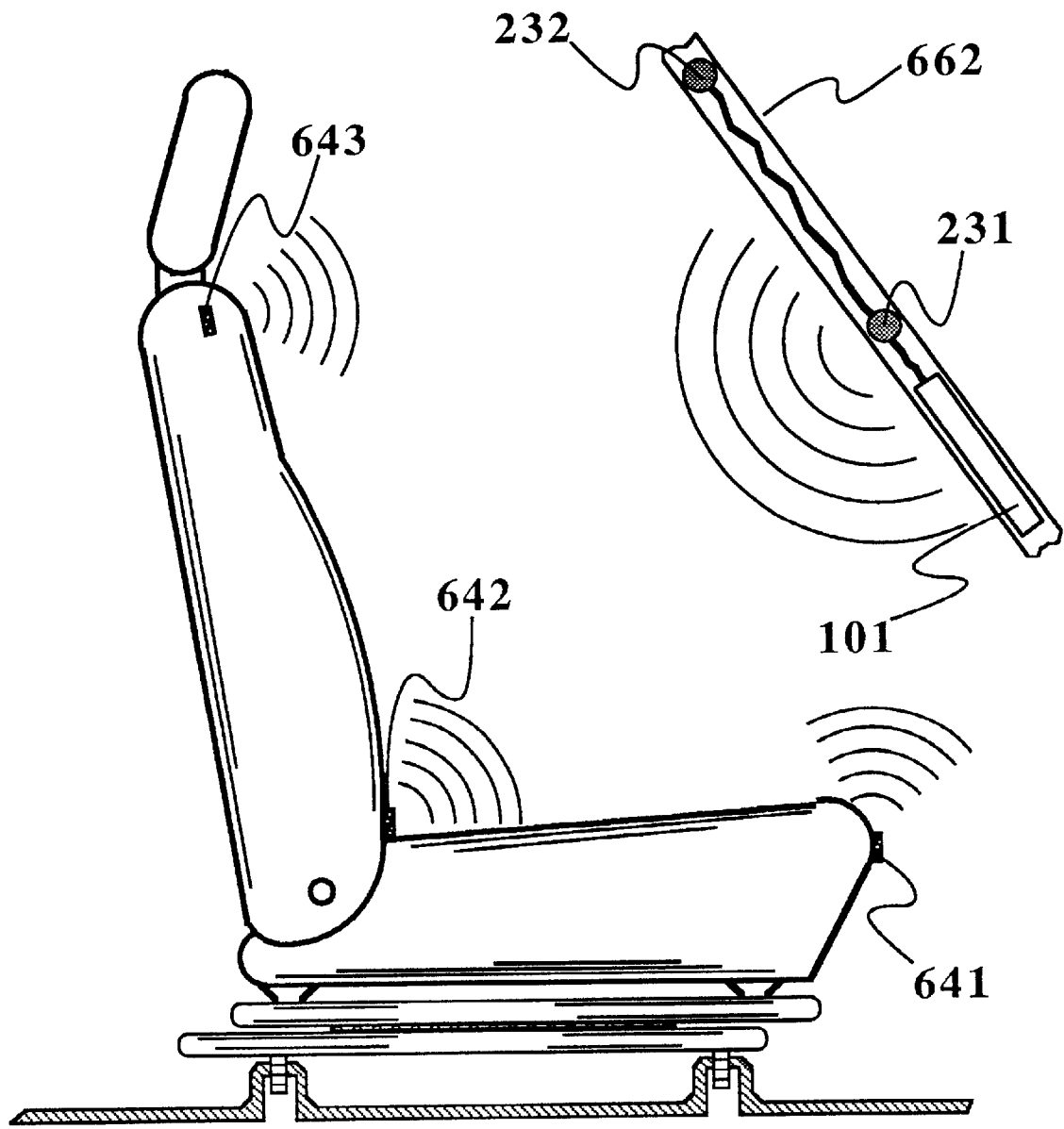
FIG. 14 is a side view with parts cutaway and removed of a seat in the passenger compartment of a vehicle showing the use of ultrasonic resonators or reflectors to determine the position of the seat.

Acoustic resonators are devices that resonate at a preset frequency when excited at that frequency. If such a device, which has been tuned to 40 kHz, is subjected to ultrasonic radiation at 40 kHz, for example, it will return a signal that is much stronger than the reflected radiation. If such a device is placed at a particular point in the passenger compartment of a vehicle, the returned signal can be easily identified as a high magnitude narrow signal at a particular point in time which is proportional to the distance from the resonator to the receiver. Since this device can be easily identified, it provides a particularly effective method of determining the distance to a particular point in the vehicle passenger compartment. If several such resonators are used they can be tuned to slightly different frequencies and therefore separated and identified by the circuitry. Using such resonators the positions of various objects in the vehicle can be determined. In FIG. 14 for example, three such resonators are placed on the vehicle seat and used to determine the location of the front and back of the seat and the top of the seat back. In this case, transducers 231 and 232, mounted in the A-pillar 662, are used in conjunction with resonators 641, 642 and 643 to determine the position of the seat. This information is then fed to the seat memory and adjustment system, not shown, eliminating the currently used sensors that are placed typically beneath the seat adjacent the seat adjustment motors. In the conventional system, the seat sensors must be wired into the seat adjustment system and are prone to being damaged. By using the vehicle interior monitoring system alone with inexpensive passive resonators, the conventional seat sensors can be eliminated resulting in a cost saving to the vehicle manufacturer. An efficient reflector, such as a parabolic shaped reflector, can be used in a similar manner as the resonator.

Resonators or reflectors, of the type described above can be used for making a variety of position measurements in the vehicle. These resonators are made to resonate at a particular frequency. If the number of resonators increases beyond a reasonable number, dual frequency resonators can be used. A pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators which resonate at different frequencies requires that they be irradiated by radiation containing those frequencies.

Figure 1A:
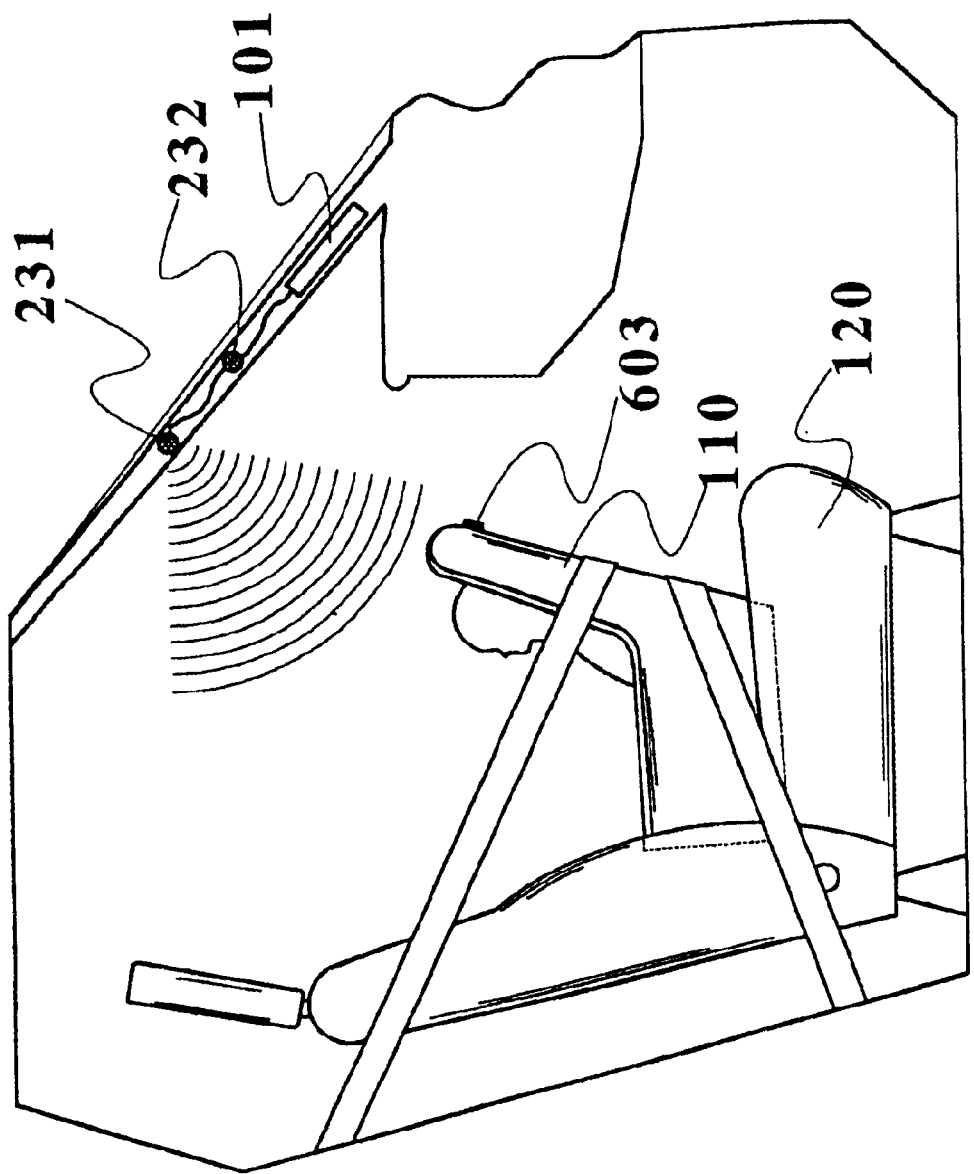
FIG. 1A is a side view with parts cutaway and removed of a vehicle showing the passenger compartment containing a rear facing child seat on the front passenger seat having a resonator or reflector placed onto the forward most portion of the child seat.
Figure 15:
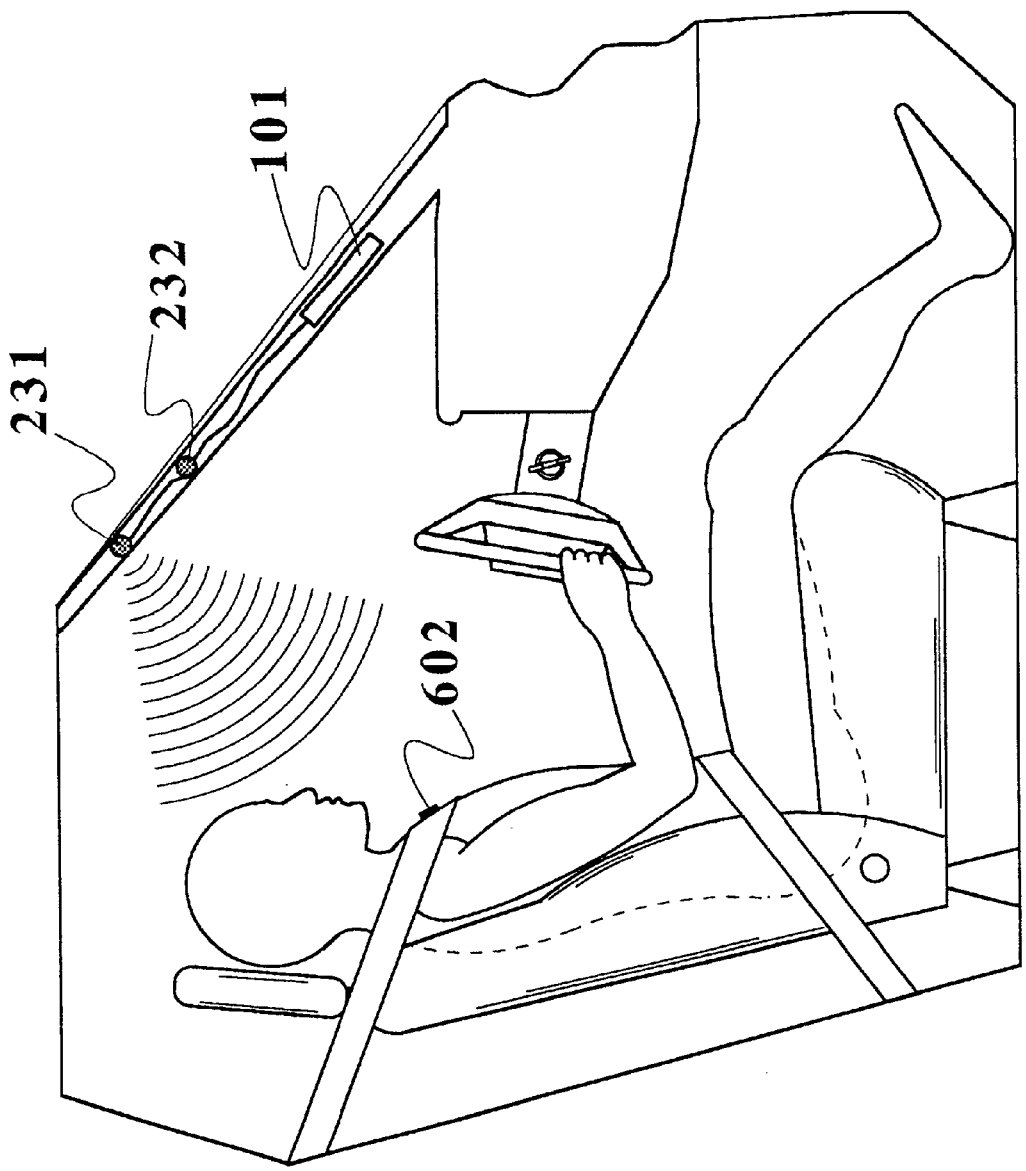
FIG. 15 is a side view with parts cutaway and removed of the passenger compartment of a vehicle showing the use of ultrasonic resonators or reflectors to determine the position of the driver seatbelt.

Another application for a resonator of the type described is to determine the location of the seatbelt and therefore determine whether it is in use. If it is known that the occupants are wearing seatbelts, the airbag deployment threshold can be increased since the airbag is not needed in low velocity accidents if the occupants are already restrained by seatbelts. This will reduce the number of deployments for cases where the airbag provides little or no improvement in safety over the seatbelt. FIG. 15, for example, shows the placement of a resonator 602 onto the front surface of the seatbelt where it can be sensed by the transducers 231 and 232. Such a system can also be used to positively identify the presence of a rear facing child seat in the vehicle. In this case the resonator 603 is placed onto the forward most portion of the child seat, or in some other convenient position, as shown in FIG. 1A.

Other uses for such resonators include placing them on doors and windows in order to determine whether either is open or closed. In FIG. 16A, for example, such a resonator 604 is placed onto the top of the window and is sensed by transducers 611 and 612. In this case, transducers 611 and 612 also monitor the space between the edge of the window glass and the top of the window opening. Many vehicles now have systems which permit the rapid opening of the window, called "express open", by a momentary push of a button. For example, when a vehicle approaches a tollbooth, the driver needs only touch the window control button and the window opens rapidly. Some automobile manufacturers do not wish to use such systems for closing the window, called "express close", because of the fear that the hand of the driver, or of a child leaning forward from the rear seat, or some other object, could get caught between the window and window frame. If the space between the edge of the window and the window frame were monitored with an interior monitoring system, this problem can be solved. The presence of the resonator or reflector 604 on the top of the window glass also gives a positive indication of where the top surface is and reflections from below that point can be ignored.

Various design variations of the window monitoring system are possible and the particular choice will depend on the requirements of the vehicle manufacturer and the characteristics of the vehicle. Two systems will be briefly described here.

Figure 16:
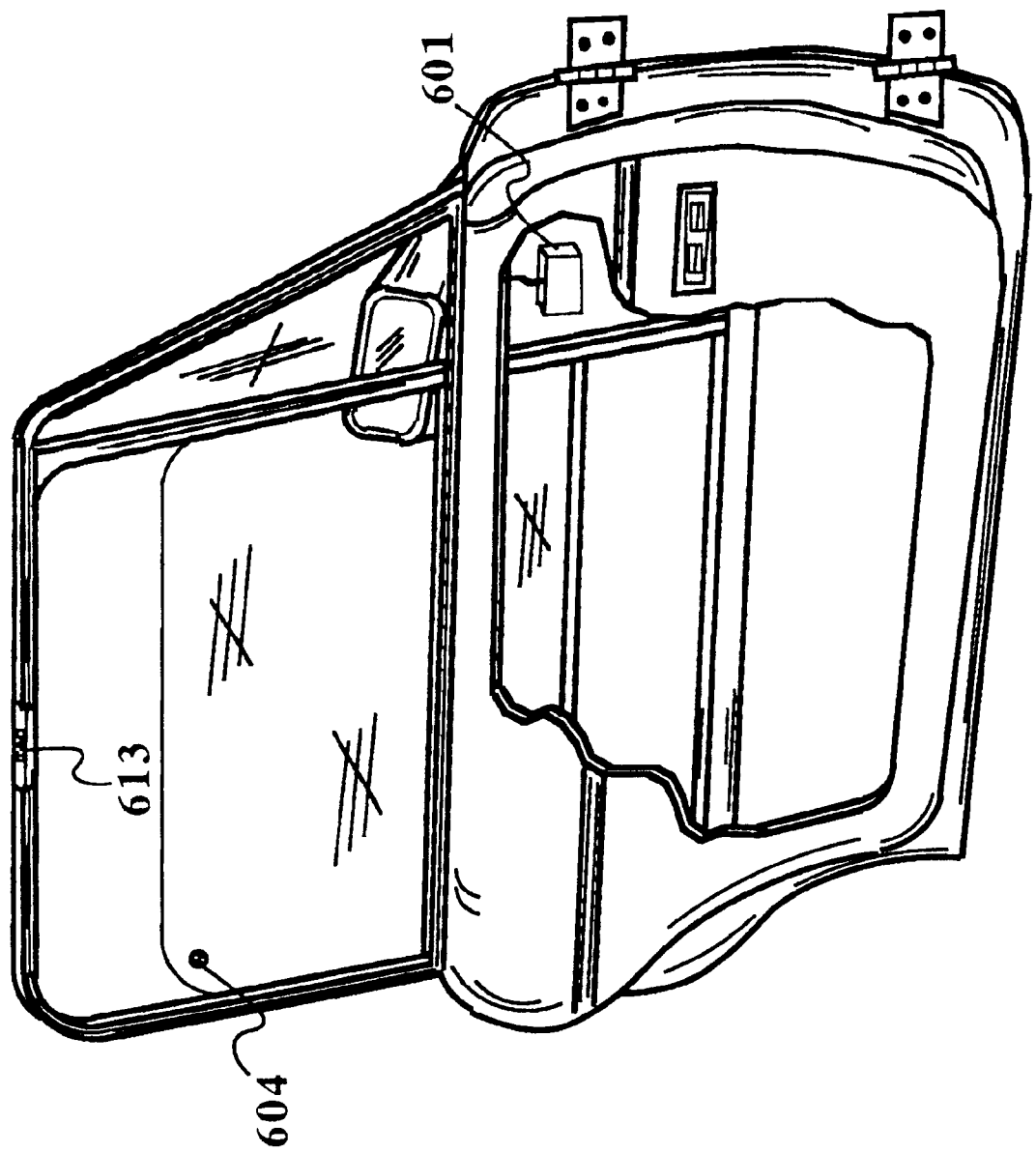
FIG. 16 is a side view with parts cutaway and removed of the passenger compartment of a vehicle showing the use of an ultrasonic resonator or reflector to determine the extent of opening of the driver window and of a system for determining the presence of an object, such as the hand of an occupant, in the window opening.
Figure 16A:
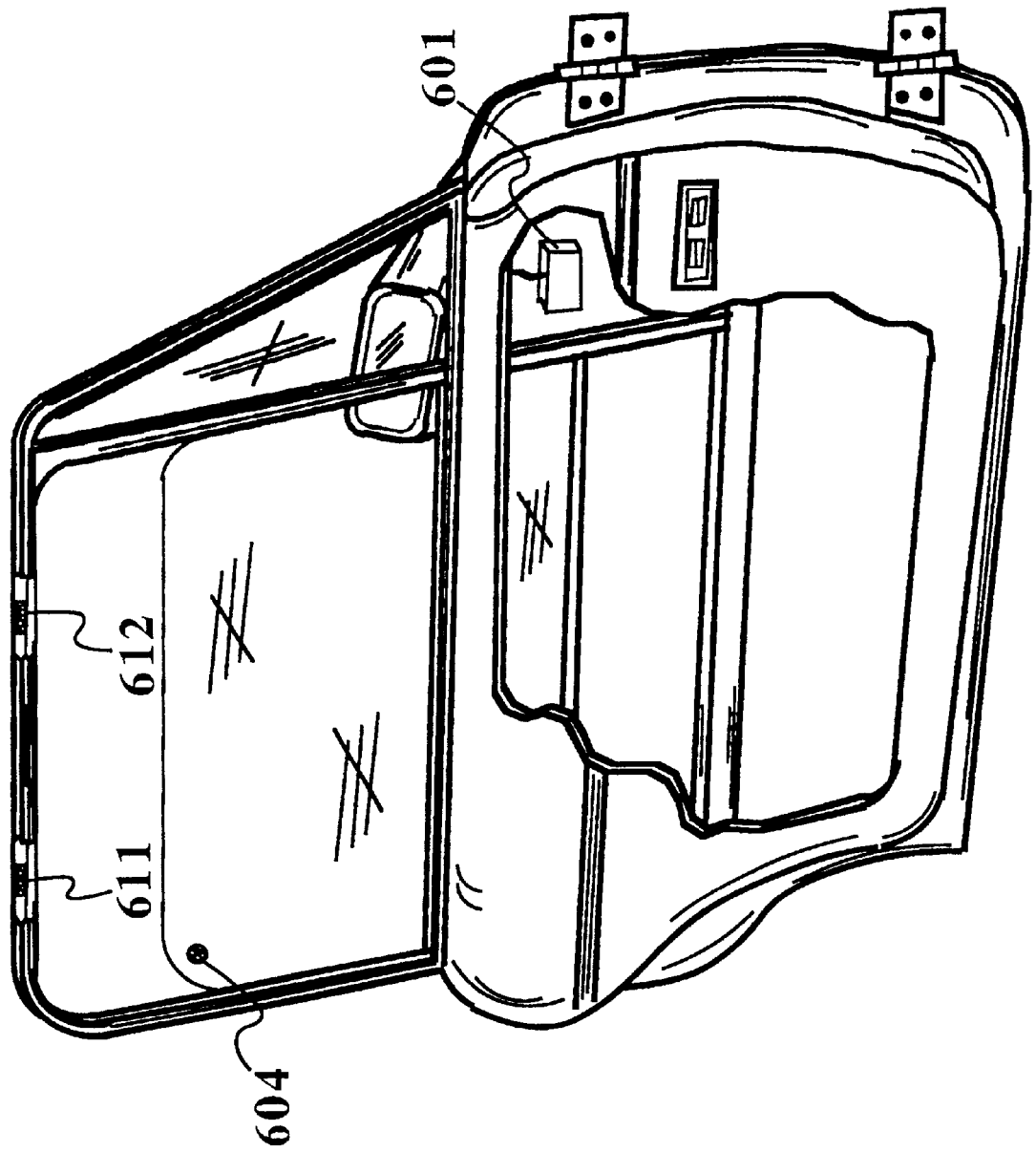
FIG. 16A is a side view with parts cutaway and removed of the passenger compartment of a vehicle showing the use of an ultrasonic resonator or reflectors to determine the extent of opening of the driver window and of another system for determining the presence of an object, such as the hand of an occupant, in the window opening.

In the first example shown in FIG. 16, a single transmitter/receiver (transducer) 613 is used in place of and located centrally midway between the transducers 611 and 612 shown in FIG. 16A. A recording of the output of transducer 613 is made of the open window without an object in the space between the window edge and the top of the window frame. When in operation, the transducer 613 receives the return signal from the space it is monitoring and compares that signal with the stored signal referenced above. This is done by processor 601. If the difference between the test signal and the stored signal indicates that there is a reflecting object in the monitored space, the window is prevented from closing in the express close mode. If the window is part way up, a reflection will be received from the edge of the window glass which, in most cases, is easily identifiable from the reflection of a hand for example. A simple algorithm based on the intensity of the reflection in most cases is sufficient to determine that an object rather than the window edge is in the monitored space. In other cases, the algorithm is used to identify the window edge and ignore that reflection and all other reflections which are lower (i.e. later in time) than the window edge. In all cases, the system will default in not permitting the express close if there is any doubt. The operator can still close the window by holding the switch in the window closing position and the window will then close slowly as it now does in vehicles without the express close feature.

In the second system, two transducers 611 and 612 are used as shown in FIG. 16A and the processor 601 comprises a neural network. In this example the system is trained for all cases where the window is down and at intermediate locations. In operation, the transducers monitor the window space and feed the received signals to processor 601. As long as the signals are similar to one of the signals for which the network was trained, the express close system is enabled. As before, the default is to suppress the express close.

Figure 17:
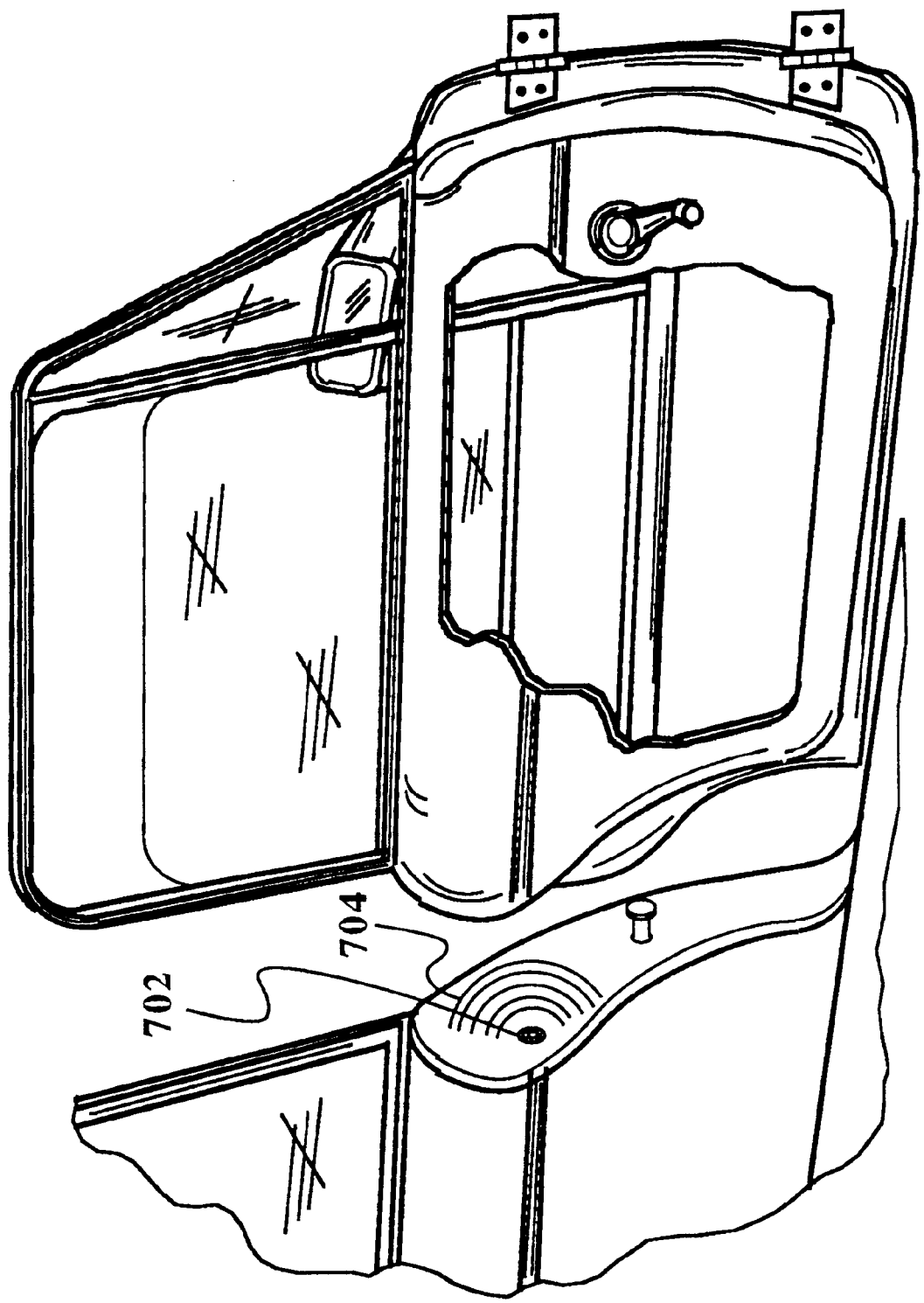
FIG. 17 is a side view with parts cutaway and removed of the passenger compartment of a vehicle showing the use of an ultrasonic resonator or reflectors to determine the extent of opening of the driver side door.

The use of a resonator, or reflector, to determine whether the vehicle door is properly shut is illustrated in FIG. 17. In this case, the resonator 702 is placed in the B-pillar in such a manner that it is shielded by the door, or by a cover or other inhibiting mechanism (not shown) engaged by the door, and prevented from resonating when the door is closed. Resonator 702 provides waves 704. If transducers such as 231 and 232 in FIG. 3 are used in this system, the closed-door condition would be determined by the absence of a return signal from the B-pillar 702 resonator. This system permits the substitution of an inexpensive resonator for a more expensive and less reliable electrical switch.

The use of an acoustic resonator has been described above. For those cases where an infrared laser system is used, an optical mirror would replace the mechanical resonator used with the acoustic system. In the acoustic system, the resonator can be any of a variety of tuned resonating systems including an acoustic cavity or a vibrating mechanical element.

Figure 18:
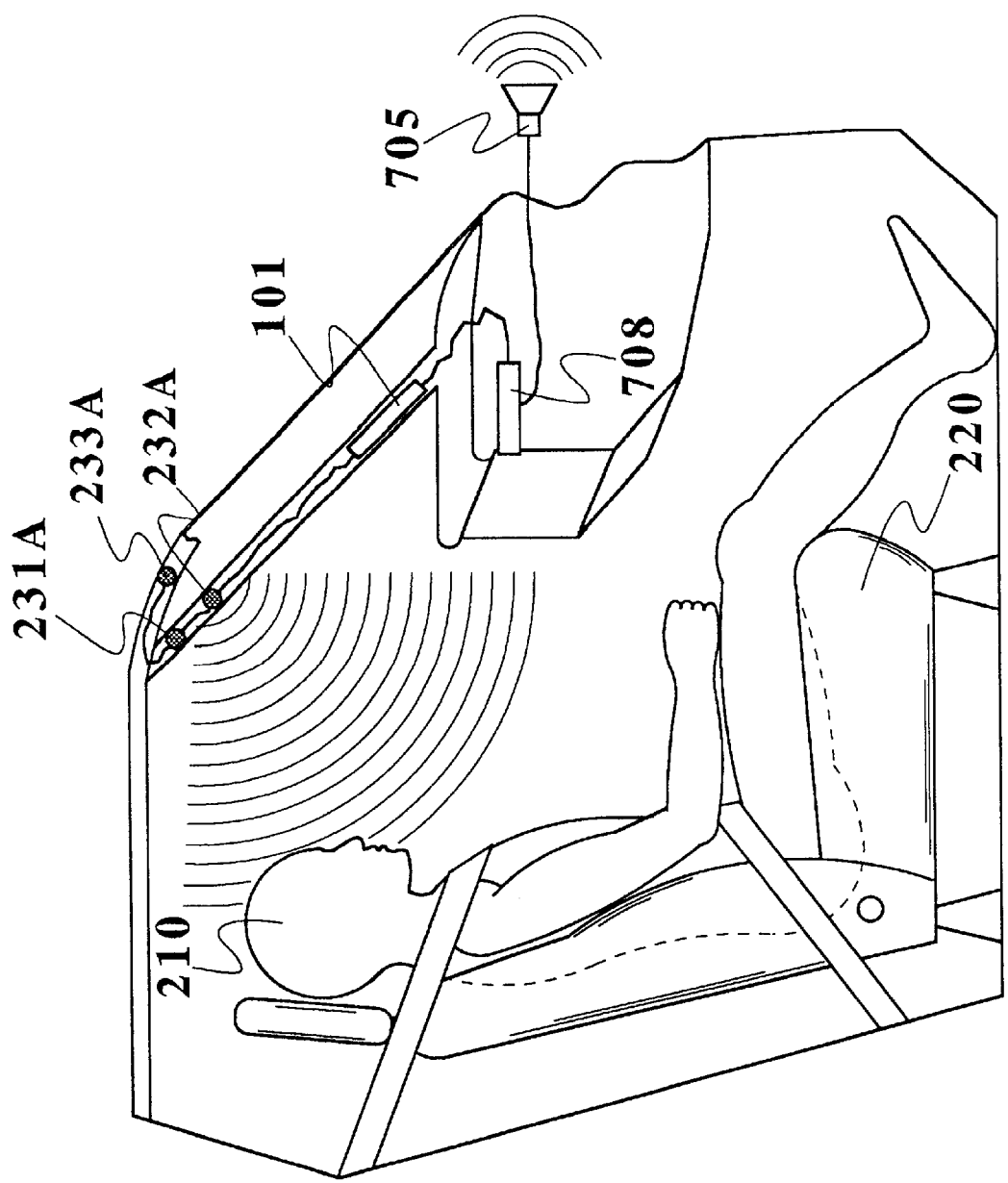
FIG. 18 is a side view with parts cutaway and removed showing schematically the interface between the vehicle interior monitoring system of this invention and the vehicle security system.

A neural network, or other pattern recognition system, can be trained to recognize certain people as permitted operators of a vehicle. In this case, if a non-recognized person attempts to operate the vehicle, the system can disable the vehicle and/or sound an alarm as illustrated in FIG. 18. In this figure the sensing transducers are shown as before as 231A, 232A and 233A, the alarm system schematically as 708 and the alarm as 705. Since it is unlikely that an unauthorized operator will resemble the authorized operator, the neural network system can be quite tolerant of differences in appearance of the operator. The system defaults to where a key must be used in the case that the system doesn't recognize the driver or the owner wishes to allow another person to operate the vehicle. The transducers 231A, 232A and 233A are sensitive to infrared radiation and the operator is irradiated with infrared waves from transducer 231A. This is necessary due to the small size of the features which need to be recognized for high accuracy of recognition. An alternate system uses an infrared laser, which can be 231A in FIG. 18, to irradiate or illuminate the operator and a CCD or CMOS device, which can be represented as 232A in FIG. 18, to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case a larger CCD element array containing 100,000 or more elements would in many cases be used instead of the 16 by 16 or 256 element CCD array used by Popesco and Vincent.

Figure 19:
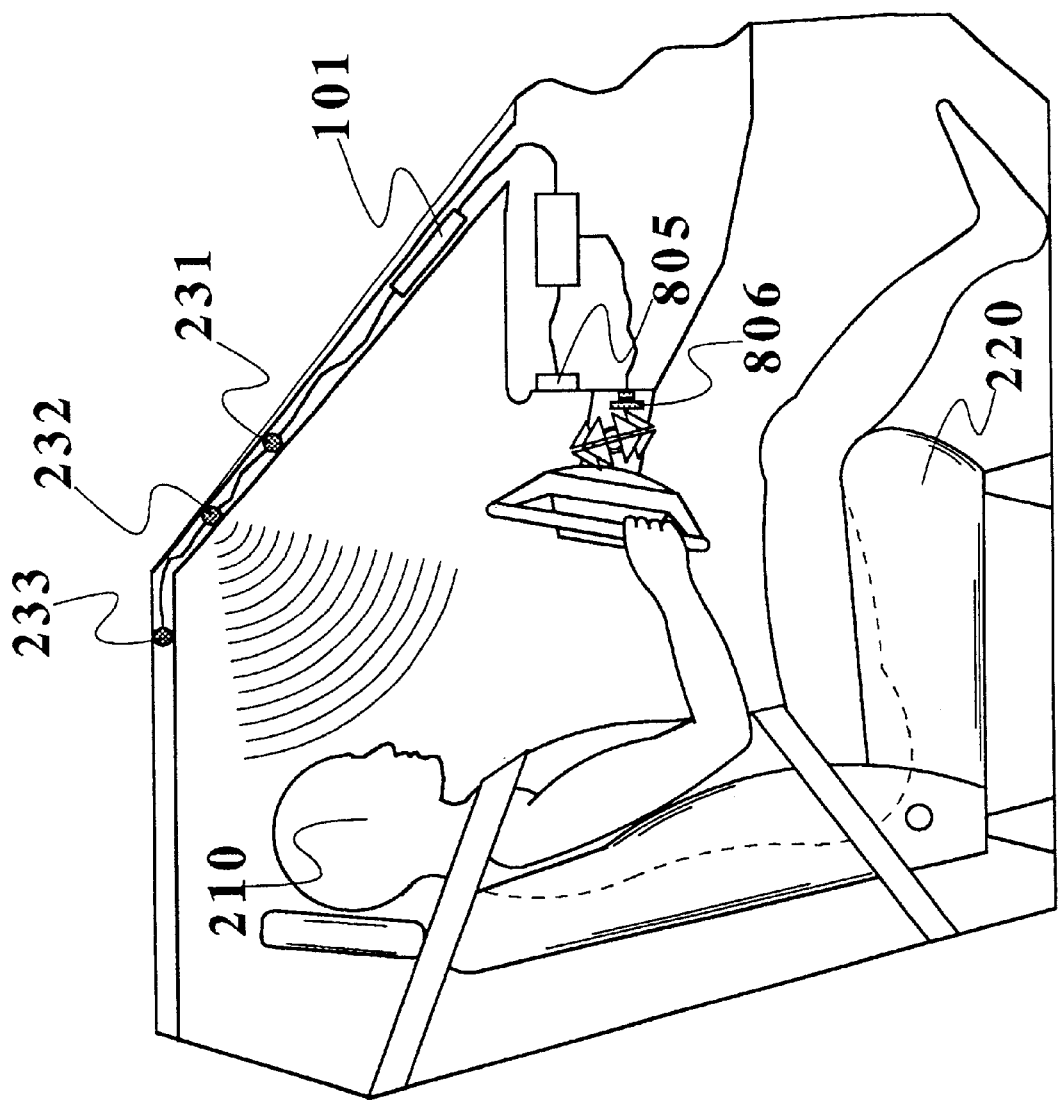
FIG. 19 is a side view with parts cutaway and removed showing schematically the interface between the vehicle interior monitoring system of this invention and an instrument panel mounted inattentiveness warning light or buzzer and reset button.

Once a vehicle interior monitoring system employing a sophisticated pattern recognition system, such as a neural network or fuzzy logic system, is in place, it is possible to monitor the motions of the driver over time and determine if he is falling asleep or has otherwise become incapacitated. In such an event, the vehicle can be caused to respond in a number of different ways. One such system is illustrated in FIG. 19 and consists of a monitoring system having transducers 231, 232 and 233 plus microprocessor 101, such as shown in FIG. 7A, programmed to compare the motions of the driver over time and trained to recognize changes in behavior representative of becoming incapacitated. If the system determines that there is a reasonable probability that the driver has fallen asleep, for example, then it can turn on a warning light shown here as 805 or send a warning sound. If the driver fails to respond to the warning by pushing a button 806, for example, then the horn and lights can be operated in a manner to warn other vehicles and the vehicle brought to a stop. One novel approach, not shown, would be to use the horn as the button 806. For a momentary depression of the horn, for this case, the horn would not sound. Naturally other responses can also be programmed.

An even more sophisticated system of monitoring the behavior of the driver is to track his eye motions using such techniques as are described in: Freidman et al, U.S. Pat. No. 4,648,052 "Eye Tracker Communication System"; Heyner et al, U.S. Pat. No. 4,720,189 "Eye Position Sensor"; Hutchinson U.S. Pat. No. 4,836,670 "Eye Movement Detector"; and, Hutchinson U.S. Pat. No. 4,950,069 "Eye Movement Detector With Improved Calibration and Speed", all of which are included herein by reference. The detection of the impaired driver in particular can be best determined by these techniques. Also, in a similar manner as described in these patents, the motion of the driver's eyes can be used to control various systems in the vehicle permitting hands off control of the entertainment system, heating and air conditioning system or all of the other systems described above. Although some of these systems have been described in the afore mentioned patents, none have made use of neural networks for interpreting the eye movements.

In most of the applications described above, single frequency energy was used to irradiate various occupying items of the passenger compartment. This was for illustrative purposes only and this invention is not limited to single frequency irradiation. In many applications, it is useful to use several discrete frequencies or a band of frequencies. In this manner, considerably greater information is received from the reflected irradiation permitting greater discrimination between different classes of objects. In general each object will have different reflectivities and transmissivities at each frequency. Also, the different resonators placed at different positions in the passenger compartment can now be tuned to different frequencies making it easier to isolate one resonator from another.

Although several preferred embodiments are illustrated and described above, there are possible combinations using other geometries, sensors, materials and different dimensions for the components that perform the same functions. This invention is not limited to the above embodiments and should be determined by the following claims.

We claim:

1. An arrangement for controlling deployment of a side airbag from an airbag module to protect an occupant in a seat of a vehicle in a crash, comprising
    determining means for determining the position of at least a part of the occupant, and
    a control circuit coupled to said determining means for controlling deployment of the side airbag based on the determined position of the at least a part of the occupant,
    said determining means comprising at least one receiver adapted to receive waves from a space above a seat portion of the seat and a processor coupled to said at least one receiver for generating a signal representative of the position of the at least a part of the occupant based on the waves received by said at least one receiver,
    said at least one receiver being capable of receiving electromagnetic waves.

2. The arrangement of claim 1, wherein said determining means further comprise a transmitter adapted to transmit waves into the space above the seat portion of the seat, said at least one receiver being arranged to receive the waves transmitted by said transmitter.

3. The arrangement of claim 2, wherein said at least one receiver is structured and arranged to convert received waves into electrical signals.

4. The arrangement of claim 1, wherein said at least one receiver is mounted in a door of the vehicle.

5. The arrangement of claim 1, wherein said at least one receive is mounted on or adjacent to the airbag module.

6. The arrangement of claim 1, wherein said control circuit control deployment of the side airbag by suppressing deployment of the side airbag, controlling a time at which deployment of the side airbag starts, controlling a rate of gas flow into the side airbag, controlling a rate of gas flow out of the side airbag or controlling a rate of deployment of the side airbag.

7. A combination of a vehicle and the arrangement of claim 1, the vehicle having a side door, at least a portion of the arrangement residing on the side door of the vehicle.

8. An arrangement for controlling deployment of a side airbag from an airbag module to protect an occupant in a seat of a vehicle in a crash, comprising
    determining means for determining whether an occupant is present in the seat, and
    a control circuit coupled to said determining means for controlling deployment of the side airbag based on whether an occupant is present in the seat,
    said determining means comprising at least one receiver adapted to receive waves from a space above a seat portion of the seat and a processor coupled to said at least one receiver for generating a signal representative of the presence or absence of an occupant in the seat based on the waves received by said at least one receiver,
    said at least one receiver being capable of receiving electromagnetic waves.

9. The arrangement of claim 8, wherein said determining means further comprise a transmitter adapted to transmit waves into the space above the seat portion of the seat, said at least one receiver being arranged to receive the waves transmitted by said transmitter.

10. The arrangement of claim 9, said at least one receiver is structured and arranged to convert received waves into electric signals.

11. The arrangement of claim 8, wherein said at least one receiver is mounted in a door of the vehicle.

12. The arrangement of claim 8, wherein said at least one receiver is mounted on or adjacent to the airbag module.

13. The arrangement of claim 8, wherein said control circuit is structured and arranged to suppress deployment of the side airbag if an occupant is not present.

14. The arrangement of claim 8, wherein said determining means determine a position of at least a part of the occupant when an occupant is in the seat and said control circuit is structured and arranged to control deployment of the side airbag based on the determined position of at least a part of the occupant.

15. A combination of a vehicle and the arrangement of claim 8, the vehicle having a side door, at least a portion of the arrangement residing on the side door of the vehicle.

16. A method for controlling deployment of a side airbag from an airbag module to protect an occupant in a seat of a vehicle in a crash, comprising the steps of:
   determining the position of at least a part of the occupant, and
   controlling deployment of the side airbag based on the determined position of the at least a part of the occupant,
   the step of determining the position of at least a part of the occupant comprising the steps of:
      transmitting waves into the space above the seat portion of the seat;
      receiving waves from a space above a seat portion of the seat; and
      generating a signal representative of the position of the at least a part of the occupant based on the received waves.

17. The method of claim 16, wherein, the step of receiving waves comprises the step of arranging an ultrasonic transducer in the vehicle in a position to receive waves from the space above the seat portion of the seat.

18. The method of claim 16, wherein the step of receiving waves comprises the step of mounting a transducer capable of receiving waves in a door of the vehicle in a position to receive waves from the space above the seat portion of the seat.

19. The method of claim 16, wherein the step of receiving waves comprises the step of mounting a transducer capable of receiving waves in a door of the vehicle on or adjacent to the airbag module in a position to receive waves from the space above the seat portion of the seat.

20. The method of claim 16, wherein the step of receiving waves comprises the step of arranging a receiver capable of receiving electromagnetic waves in the vehicle in a position to receive electromagnetic waves from the space above the seat portion of the seat.

21. The method of claim 16, wherein the step of controlling deployment of the side airbag comprises at least one of the steps of suppressing deployment of the side airbag, controlling a time at which deployment of the side airbag starts, controlling a rate of gas flow into the side airbag, controlling a rate of gas flow out of the side airbag and controlling a rate of deployment of the side airbag.

22. A method for controlling deployment of a side airbag from an airbag module to protect an occupant in a seat of a vehicle in a crash, comprising the steps of:
   determining whether an occupant is present in the seat, and
   controlling deployment of the side airbag based on the presence or absence of an occupant in the seat,
   the step of determining whether an occupant is present in the seat comprising the steps of:
      transmitting waves into the space above the seat portion of the seat;
      receiving waves from a space above a seat portion of the seat; and
      generating a signal representative of the presence or absence of an occupant in the seat based on the received waves.

23. The method of claim 22, wherein the step of receiving waves comprises the step of arranging an ultrasonic transducer in the vehicle in a position to receive waves from the space above the seat portion of the seat.

24. The method of claim 22, wherein the step of receiving waves comprises the step of mounting a transducer capable of receiving waves in a door of the vehicle in a position to receive waves from the space above the seat portion of the seat.

25. The method of claim 22, step of receiving waves comprises the step of mounting a transducer capable of receiving waves in a door of the vehicle on or adjacent to the airbag module in a position to receive waves from the space above the seat portion of the seat.

26. The method of claim 22, wherein the step of receiving waves comprises the step of arranging a receiver capable of receiving electromagnetic waves in the vehicle in a position to receive electromagnetic waves from the space above the seat portion of the seat.

27. The method of claim 22, wherein the step of controlling deployment of the side airbag comprises at least one of the steps of suppressing deployment of the side airbag, controlling a time at which deployment of the side airbag starts, controlling a rate of gas flow into the side airbag, controlling a rate of gas flow out of the side airbag and controlling a rate of deployment of the side airbag.

28. The method of claim 22, comprising the steps of:
   determining a position of at least a part of the occupant when an occupant is in the seat, and
   controlling deployment of the side airbag based on the determined position of at least a part of the occupant.

29. An arrangement for controlling deployment of a side airbag from an airbag module to protect an occupant in a seat of a vehicle in a crash, comprising
   determining means for determining the position of at least a part of the occupant, and
   a control circuit coupled to said determining means for controlling deployment of the side airbag based on the determined position of the at least a part of the occupant,
   said determining means comprising:
      a transmitter adapted to transmit waves into the space above the seat portion of the seat,
      at least one receiver adapted to receive waves from a space above a seat portion of the seat, said at least one receiver being arranged to receive the waves transmitted by said transmitter; and
      a processor coupled to said at least one receiver for generating a signal representative of the position of the at least a part of the occupant based on the waves received by said at least one receiver.

30. The arrangement of claim 29, herein said at least one receiver is structured and arranged to convert received waves into electrical signals.

31. The arrangement of claim 29, wherein said at least one receiver is an ultrasonic transducer.

32. An arrangement for controlling deployment of a side airbag from an airbag module protect an occupant in a seat of a vehicle in a crash, comprising
   determining means for determining whether an occupant is present in the seat, and
   a control circuit coupled to said determining means for controlling deployment of the side airbag based on whether an occupant is present in the seat,
   said determining means comprising:
      a transmitter adapted to transmit waves into the space above the seat portion of the seat;
      at least one receiver adapted to receive waves from a space above a seat portion of the seat, said at least one receiver being arranged to receive the waves transmitted by said transmitter; and a processor coupled to said at least one receiver for generating a signal representative of the presence or absence of an occupant in the seat based on the waves received by said at least one receiver.

33. The arrangement of claim 32, wherein said at least one receiver is structured and arranged to convert received waves into electrical signals.

34. The arrangement of claim 32, wherein said at least one receiver is an ultrasonic transducer.

35. A method for controlling deployment of a side airbag from an airbag module to protect an occupant in a seat of a vehicle in a crash, comprising the steps of:

determining the position of at least a part of the occupant, and controlling deployment of the side airbag based on the determined position of the at least a part of the occupant, the step of determining the position of at least a part of the occupant comprising the steps of:

receiving waves from a space above a seat portion of the seat; and generating a signal representative of the position of the at least a part of the occupant based on the received waves;

the step of receiving waves comprising the step of arranging a receiver capable of receiving electromagnetic waves in the vehicle in a position to receive electromagnetic waves from the space above the seat portion of the seat.

36. A method for controlling deployment of a side airbag from an airbag module to protect an occupant in a seat of a vehicle in a crash, comprising the steps of:

determining the position of at least a part of the occupant, and controlling deployment of the side airbag based on the determined position of the at least a part of the occupant, the step of controlling deployment of the side airbag comprising at least one of the steps of suppressing deployment of the side airbag, controlling a time at which deployment of the side airbag starts, controlling a rate of gas flow into the side airbag, controlling a rate of gas flow out of the side airbag and controlling a rate of deployment of the side airbag.

37. A method for controlling deployment of a side airbag from an airbag module to protect an occupant in a seat of a vehicle in a crash, comprising the steps of:

determining whether an occupant is present in the seat, and controlling deployment of the side airbag based on the presence or absence of an occupant in the seat, the step of determining whether an occupant is present in the seat comprising the steps of:

receiving waves from a space above a seat portion of the seat; and generating a signal representative of the presence or absence of an occupant in the seat based on the received waves, the step of receiving waves comprising the step of arranging a receiver capable of receiving electromagnetic waves in the vehicle in a position to receive electromagnetic waves from the space above the seat portion of the seat.

38. A method for controlling deployment of a side airbag from an airbag module to protect an occupant in a seat of a vehicle in a crash, comprising the steps of:

determining whether an occupant is present in the seat, and controlling deployment of the side airbag based on the presence or absence of an occupant in the seat, the step of controlling deployment of the side airbag comprising at least one of the steps of suppressing deployment of the side airbag, controlling a time at which deployment of the side airbag starts, controlling a rate of gas flow into the side airbag, controlling a rate of gas flow out of the side airbag and controlling a rate of deployment of the side airbag.

* * * * *

UNITED STATES PATENT AND TRADEMARK OFFICE
CERTIFICATE OF CORRECTION

| | | |
|---|---|---|
| PATENT NO. | : 6,712,387 C1 | Page 1 of 1 |
| APPLICATION NO. | : 90/010035 | |
| DATED | : November 9, 2010 | |
| INVENTOR(S) | : David S. Breed, Wilbur E. DuVall and Wendell C. Johnson | |

It is certified that error appears in the above-identified patent and that said Letters Patent is hereby corrected as shown below:

Claim 1, Col. 1, line 55, change "supress" to --suppress--.
Claim 16, Col. 2, line 62, after "the step", insert --of--.
Claim 16, Col. 2, line 62, before "deployment", insert --suppressing--.
Claim 27, Col. 3, line 54, change "airbab" to --airbag--.
Claim 36, Col. 5, line 56, after "the step", insert --of--.

Signed and Sealed this
Fourteenth Day of June, 2011

David J. Kappos
*Director of the United States Patent and Trademark Office*

(12) EX PARTE REEXAMINATION CERTIFICATE (7861st)
United States Patent
Breed et al.

(10) Number: US 6,712,387 C1
(45) Certificate Issued: *Nov. 9, 2010

(54) METHOD AND APPARATUS FOR CONTROLLING DEPLOYMENT OF A SIDE AIRBAG

(75) Inventors: David S. Breed, Boonton Township, Morris County, NJ (US); Wilbur E. DuVall, Kimberling City, MO (US); Wendell C. Johnson, San Diego, CA (US)

(73) Assignee: Automotive Technologies International, Inc., Denville, NJ (US)

Reexamination Request:
No. 90/008,352, Nov. 27, 2006
No. 90/010,035, Oct. 11, 2007

Reexamination Certificate for:
Patent No.: 6,712,387
Issued: Mar. 30, 2004
Appl. No.: 09/437,535
Filed: Nov. 10, 1999

( * ) Notice: This patent is subject to a terminal disclaimer.

Related U.S. Application Data

(63) Continuation-in-part of application No. 09/047,703, filed on Mar. 25, 1998, now Pat. No. 6,039,139, which is a continuation-in-part of application No. 08/905,876, filed on Aug. 4, 1997, now Pat. No. 5,848,802, and a continuation-in-part of application No. 08/640,068, filed on Apr. 30, 1996, now Pat. No. 5,829,782, which is a continuation of application No. 08/505,036, filed on Jul. 21, 1995, now Pat. No. 5,653,462, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned.

(51) Int. Cl.
*B60R 21/16* (2006.01)

(52) U.S. Cl. .................... 280/735; 180/272; 180/273
(58) Field of Classification Search .................... None
See application file for complete search history.

(56) References Cited

U.S. PATENT DOCUMENTS

| 2,333,160 A | 11/1943 | Dunn |
| 4,625,329 A | 11/1986 | Ishikawa et al. |

(Continued)

FOREIGN PATENT DOCUMENTS

| DE | 40 23 109 A1 | 1/1992 |
| DE | 40 23 109 | 1/1992 |
| GB | 2 333 160 A | 1/1999 |

OTHER PUBLICATIONS

Abstract of German Patent Publication No. DE 3212618.
Abstract of German Patent Publication No. DE 3248222.
Abstract of German Patent Publication No. DE 3809074.

(Continued)

*Primary Examiner*—Joseph A. Kaufman

(57) ABSTRACT

An arrangement and method for controlling deployment of a side airbag from an airbag module to protect an occupant in a seat of a vehicle in a crash. The presence of an occupant and/or position of the occupant or a part thereof is/are determined and deployment of the side airbag is controlled based thereon. To determine the presence of the occupant and/or position of the occupant or part thereof, a transducer is arranged to receive waves from a space above a seat portion of the seat and a signal representative of the presence and/or position of the occupant is generated based on the waves received by the transducer. The transducer can be designed to transmit waves into the space above the seat portion of the seat which are also receivable thereby. The transducer may be mounted in a door of the vehicle to enable the distance between the occupant and the door to be determined, i.e., to determine whether the occupant is leaning against the door, and possibly adjacent the airbag module if it is situated in the door. In these cases, deployment of the side airbag can be suppressed. In the alternative the time at which deployment of the side airbag starts, the rate of gas flow into the side airbag, the rate of gas flow out of the side airbag and/or the rate of deployment of the side airbag is/are controlled.

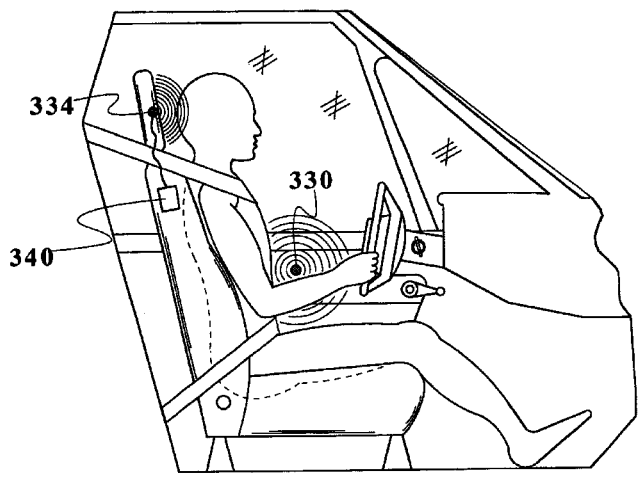

U.S. PATENT DOCUMENTS

| | | | |
|---|---|---|---|
| 4,966,388 | A | 10/1990 | Warner et al. |
| 5,071,160 | A | 12/1991 | White et al. |
| 5,072,966 | A | 12/1991 | Nishitake et al. |
| 5,118,134 | A | 6/1992 | Mattes et al. |
| 5,161,820 | A | 11/1992 | Vollmer |
| 5,164,901 | A | 11/1992 | Blackburn et al. |
| 5,172,790 | A | 12/1992 | Ishikawa et al. |
| 5,173,614 | A | 12/1992 | Woehrl et al. |
| 5,202,831 | A | 4/1993 | Blackburn et al. |
| 5,219,413 | A | 6/1993 | Lineberger |
| 5,222,761 | A | 6/1993 | Kaji et al. |
| 5,232,243 | A | 8/1993 | Blackburn et al. |
| 5,247,584 | A | 9/1993 | Krogmann |
| 5,364,125 | A | 11/1994 | Brown et al. |
| 5,464,246 | A | 11/1995 | Castro et al. |
| 5,494,311 | A | 2/1996 | Blackburn et al. |
| 5,573,269 | A | 11/1996 | Gentry et al. |
| 5,585,775 | A | 12/1996 | Ishishita |
| 5,602,425 | A | 2/1997 | Wilhelmi et al. |
| 5,612,876 | A | 3/1997 | Zeidler et al. |
| 5,624,132 | A | 4/1997 | Blackburn et al. |
| 5,683,103 | A | 11/1997 | Blackburn et al. |
| 5,722,686 | A | 3/1998 | Blackburn et al. |
| 5,737,083 | A | 4/1998 | Owechko et al. |
| 5,785,347 | A | 7/1998 | Adolph et al. |
| 5,890,085 | A | 3/1999 | Corrado et al. |
| 5,993,015 | A | 11/1999 | Fredricks |
| 6,015,163 | A | 1/2000 | Langford et al. |
| 6,088,640 | A | 7/2000 | Breed |
| 6,263,271 | B1 | 7/2001 | Oka et al. |
| 6,325,414 | B2 | 12/2001 | Breed et al. |
| 6,356,194 | B1 | 3/2002 | Fukui et al. |
| 2008/0157510 | A1 | 7/2008 | Breed et al. |

OTHER PUBLICATIONS

Abstract of German Patent Publication No. DE 3836712.
Abstract of German Patent Publication No. DE 4115202.
Abstract of German Patent Publication No. DE 4133237.
Abstract of German Patent Publication No. DE 4237072.
Abstract of German Patent Publication No. DE 19530092.
Abstract of German Patent Publication No. DE 19706623.
Abstract of Japanese Patent Publication No. JP 2–293234.
Description of German Patent Publication No. DE 8706578.
Description of German Patent Publication No. DE 9011378.
Mechanical Versus Accelerometer Based Sensing for Supplemental Inflatable Restraint Systems, Tony D. Hendrix et al., AES Paper No. 901121, pp. 13–22.
Electronic Crash Sensors for Restraint Systems, Dietrich E. Bergfried et al., SAE Paper No. 901136, pp. 169–177.
Airbag Systems—Their Permanent Monitoring and Its Meaning to the User, Alfons Hartl et al., SA Paper No. 901138, pp. 187–193.
Using Seat Mounted Accelerometers to Differentiate Between Normally Seated Passengers and Infants in Infant Seats, Alan L. Browne et al. GM R&D Center Paper No. 933092, pp. 147–162.
The Use of Signal Processing Techniques in an Occupant Detection System, Edward J. Gillis et al., Automotive Systems Lab. Paper No. 940906, pp. 65–70.
The BMW Seat Occupancy Monitoring System: A Step Towards "Situation Appropriate Airbag Deployment", Klaus Kompass et al, SAE Paper No. 960226, pp. 17–25.
The New Generation of the BMW Child Seat and Occupant Detection System SBE 2, Yan Lu et al., Int'l Journal of Automotive Technology, vol. 3, No. 2, pp. 53–56.
Injury Reduction Potential for "Smart" Airbags, Steven R. Fredin, 39th Annual Proceedings, Assoc. for the Advancement of Automotive Medicine, Oct. 16–18, 1995, pp. 557–566.
Zinke, D. Theodore, *Small Car Front Seat Passenger Inflatable Restraint System*, vol. II—Citation Air Bag Systems, Highway Safety Research Institute, Final Report, Apr. 1981.
Castelli, Vittori and Breed, David S., *Trends in Sensing Side Impacts*, SAE Technical Paper 890603 Series; International Congress and Exposition, Detroit, Michigan, Feb. 27–Mar. 3, 1989.
Olsson, Jan A., Skötte, Lars–Gunnar, *Air Bag System for Side Impact Protection*, Twelfth International Technical Conference on Experimental Safety Vehicles, Proceedings vol. 2, pp. 976–983, Goteborg Sweden, 1989.
Breed, David, Sanders, W. Thomas, Castelli, Vittorio, *Frontal Impact Protection: Seat Belts and Air Bags*, SAE Paper 930650, Mar. 1993.

US 6,712,387 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 13, 14 and 28 are cancelled.

Claims 1, 5, 6, 8, 16, 17, 21, 22, 25, 27, 29, 30, 32, and 35-38 are determined to be patentable as amended.

Claims 2-4, 7, 9-12, 15, 18-20, 23, 24, 26, 31, 33 and 34, dependent on an amended claim, are determined to be patentable.

New claims 39-53 are added and determined to be patentable.

1. An arrangement for controlling deployment of a side airbag from an airbag module *on a side of the vehicle* to protect an occupant in a seat of a vehicle in a crash *when the occupant is present*, comprising
  determining means for *identifying the occupant to determine whether the occupant has characteristics of a child and for* determining the position of [at least a part of] the occupant *relative to the airbag module, said determining means determining based on the identification of the occupant as having characteristics of a child and the position of the occupant relative to the airbag module whether the head of the child is against the airbag module*, and
  a control circuit coupled to said determining means for controlling deployment of the side airbag based on the determined position of the [at least a part of the] occupant *relative to the airbag module*,
  said determining means comprising at least one receiver adapted to receive waves from a space above a seat portion of the seat and a processor coupled to said at least one receiver for generating a signal representative of the position of the [at least a part of the] occupant *relative to the airbag module* based on the waves received by said at least one receiver, said at least one receiver being capable of receiving electromagnetic waves,
  *said control circuit being arranged to supress deployment of the side airbag when the occupant is determined to have characteristics of a child by said determining means and the head of the child is determined to be against the airbag module by said determining means.*

5. The arrangement of claim 1, wherein said at least one [receive] *receiver* is mounted on or adjacent to the airbag module.

6. The arrangement of claim 1, wherein *when* said control circuit [control] *does not suppress deployment of the side airbag, said control circuit controls* deployment of the side airbag by [suppressing deployment of the side airbag,] controlling a time at which deployment of the side airbag starts, controlling a rate of gas flow into the side airbag, controlling a rate of gas flow out of the side airbag or controlling a rate of deployment of the side airbag.

8. An arrangement for controlling deployment of a side airbag from an airbag module *on a side of the vehicle* to protect an occupant in a seat of a vehicle in a crash *when the occupant is present*, comprising
  determining means for determining whether an occupant is present in the seat, *identifying whether the occupant when present has characteristics of a child and determining the position of the occupant when present relative to the airbag module, said determining means determining based on the identification of the occupant as having characteristics of a child and the position of the occupant relative to the airbag module whether the head of the child is against the airbag module*, and
  a control circuit coupled to said determining means for controlling deployment of the side airbag based on whether an occupant is present in the seat *and the determined position of the occupant relative to the airbag module*,
  said determining means comprising at least one receiver adapted to receive waves from a space above a seat portion of the seat and a processor coupled to said at least one receiver for generating a signal representative of the presence or absence of an occupant in the seat based on the waves received by said at least one receiver,
  said at least one receiver being capable of receiving electromagnetic waves,
  *said control circuit being arranged to suppress deployment of the side airbag when the occupant is not present as determined by said determining means, and when the occupant is determined to have characteristics of a child by said determining means and the head of the child is determined to be against the airbag module by said determining means.*

16. A method for controlling deployment of a side airbag from an airbag module *on a side of a vehicle* to protect an occupant in a seat of a vehicle in a crash *when the occupant is present*, comprsing the steps of:
  *determining whether the occupant has characteristics of a child,*
  determining the position of [at least a part of] the occupant *relative to the airbag module*, and
  controlling deployment of the side airbag based on the determined position of the [at least a part of the] occupant *relative to the airbag module and the determination of whether the occupant has characteristics of a child,*
  the step of determining the position of [at least a part of] the occupant comprising the steps of:
    transmitting waves into the space above the seat portion of the seat;
    receiving waves from a space above a seat portion of the seat; [and]
    generating a signal representative of the position of the [at least a part of the] occupant based on the received waves, *and*
    *determining the position of the head of the occupant,*
  *the step controlling deployment of the side airbag comprising deployment of the side airbag when the occupant has characteristics of a child and the head of the child is against the airbag module.*

17. The method of claim 16, wherein [,] the step of receiving waves comprises the step of arranging an ultrasonic transducer in the vehicle in a position to receive waves from the space above the seat portion of the seat.

21. The method of claim 16, wherein the step of controlling deployment of the side airbag *further* comprises, *when deployment of the side airbag is not suppressed,* at least one of the steps of [suppressing deployment of the side airbag,] controlling a time at which deployment of the side airbag starts, controlling a rate of gas flow into the side airbag, controlling a rate of gas flow out of the side airbag and controlling a rate of deployment of the side airbag.

22. A method for controlling deployment of a side airbag from an airbag module *on a side of a vehicle* to protect an occupant in a seat of a vehicle in a crash *when the occupant is present*, comprising the steps of:
   determining whether an occupant is present in the seat,
   *determining whether the occupant has characteristics of a child,*
   *determining the position of the occupant relative to the airbag module,* and
   controlling deployment of the side airbag based on the presence or absence of an occupant in the seat, *the determination whether the occupant has characteristics of a child and the determined position of the occupant relative to the airbag module,*
   the step of determining whether an occupant is present in the seat comprising the steps of:
      transmitting waves into the space above the seat portion of the seat;
      receiving waves from a space above a seat portion of the seat; [and]
      generating a signal representative of the presence or absence of an occupant in the seat based on the received waves, *and*
      *determining the position of the head of the occupant,*
   *the step of controlling deployment of the side airbag comprising suppressing deployment of the side airbag based on the absence or presence of the occupant and the determined position of the occupant,*
   *the step of suppressing deployment of the side airbag comprising:*
   *suppressing deployment of the side airbag when an occupant is not determined to be present; and*
   *suppressing deployment of the side airbag when the occupant is determined to have characteristics of a child and the head of the child is against the airbag module.*

25. The method of claim 22, *wherein the* step of receiving waves comprises the step of mounting a transducer capable of receiving waves in a door of the vehicle on or adjacent to the airbag module in a position to receive waves from the space above the seat portion of the seat.

27. The method of claim 22, wherein the step of controlling deployment of the side airbab *when an occupant is present* comprises at least one of the steps of [suppressing deployment of the side airbag,] controlling a time at which deployment of the side airbag starts, controlling a rate of gas flow into the side airbag, controlling a rate of gas flow out of the side airbag and controlling a rate of deployment of the side airbag.

29. An arrangement for controlling deployment of a side airbag from an airbag module *on a side of a vehicle* to protect an occupant in a seat of a vehicle in a crash *when the occupant is present*, comprising
   determining means for *identifying the occupant to determine whether the occupant has characteristics of a child and for* determining the position of [at least a part of] the occupant *relative to the airbag module, said determining means determining based on the identification of the occupant as having characteristics of a child and the position of the occupant relative to the airbag module whether the head of the child is against the airbag module,* and
   a control circuit coupled to said determining means for controlling deployment of the side airbag based on the determined position of the [at least a part of the] occupant *relative to the airbag module,*
   said determining means comprising:
      a transmitter adapted to transmit waves into the space above the seat portion of the seat,
      at least one receiver adapted to receive waves from a space above a seat portion of the seat, said at least one receiver being arranged to receive the waves transmitted by said transmitter; and
      a processor coupled to said at least one receiver for generating a signal representative of the position of the [at least a part of the] occupant based on the waves received by said at least one receiver,
   *said control circuit being arranged to suppress deployment of the side airbag when the occupant is determined to have characteristics of a child by said determining means and the head of the child is determined to be against the airbag module by said determining means.*

30. The arrangement of claim 29, [herein] *wherein* said at least one receiver is structured and arranged to convert received waves into electrical signals.

32. An arrangement for controlling deployment of a side airbag from an airbag module *on a side of the vehicle* to protect an occupant in a seat of a vehicle in a crash *when the occupant is present*, comprising
   determining means for determining whether an occupant is present in the seat *and the position of the occupant when present relative to the airbag module and for identifying whether the occupant when present has characteristics of a child, said determining means determining based on the identification of the occupant as having characteristics of a child and the position of the occupant relative to the airbag module whether the head of the child is against the airbag module,* and
   a control circuit coupled to said determining means for controlling deployment of the side airbag based on whether an occupant is present in the seat *and the determined position of the occupant relative to the airbag module,*
   said determining means comprising:
      a transmitter adapted to transmit waves into the space above the seat portion of the seat;
      at least one receiver adapted to receive waves from a space above a seat portion of the seat, said at least one receiver being arranged to receive the waves transmitted by said transmitter; and
      a processor coupled to said at least one receiver for generating a signal representative of the presence or absence of an occupant in the seat on the waves received by said at least one receiver,
   *said control circuit being arranged to suppress deployment of the side airbag when the occupant is not present as determined by said determining means, and when the occupant is determined to have characteristics of a child by said determining means and the head of the child is determined to be against the airbag module by said determining means.*

35. A method for controlling deployment of a side airbag from an airbag module *on a side of the vehicle* to protect an occupant in a seat of a vehicle in a crash *when the occupant is present*, comprising the steps of:
- *determining whether the occupant has characteristics of a child,*
- determining the position of [at least a part of] the occupant *relative to the airbag module,* and
- controlling deployment of the side airbag based on the determined position of the [at least a part of the] occupant *relative to the airbag module and the determination of whether the occupant has characteristics of a child,*
- the step of determining the position of [at least a part of] the occupant the steps of:
  - receiving waves from a space above a seat portion of the seat; [and]
  - generating a signal representative of the position of the [at least a part of the] occupant based on the received waves, *and*
  - *determining the position of the head of the occupant;*
  - the step of receiving waves comprising the step of arranging a receiver capable of receiving electromagnetic waves in the vehicle in a position to receive electromagnetic waves from the space above the seat portion of the seat,
  - *the step of controlling deployment of the side airbag comprising suppressing deployment of the side airbag when the occupant is determined to have characteristics of a child and the head of the child is against the airbag module.*

36. A method for controlling deployment of a side airbag from an airbag module *on a side of the vehicle* to protect an occupant in a seat of a vehicle in a crash *when the occupant is present*, comprising the steps of:
- *determining whether the occupant has characteristics of a child,*
- determining the position of [at least a part of] the occupant *relative to the airbag module,* and
- controlling deployment of the side airbag based on the determined position of the [at least a part of the] occupant *relative to the airbag module and the determination of whether the occupant has characteristics of a child,*
- the step of controlling deployment of the side airbag comprising at least one of the steps of suppressing deployment of the side airbag, controlling a time at which deployment of the side airbag starts, controlling a rate of gas flow into the side airbag, controlling a rate of gas flow out of the side airbag and controlling a rate of deployment of the side airbag,
- *the step of determining the position of the occupant comprising determining the position of the head of the occupant,*
- *the step suppressing deployment of the side airbag comprising suppressing deployment of the side airbag when the occupant is determined to have characteristics of a child and the head of the child is against the airbag module.*

37. A method for controlling deployment of a side airbag from an airbag module *on a side of the vehicle* to protect an occupant in a seat of a vehicle in a crash *when the occupant is present*, comprising the steps of:
- determining whether an occupant is present in the seat,
- *determining whether the occupant has characteristics of a child,*
- *determining the position of the occupant relative to the airbag module,* and
- controlling deployment of the side airbag based on the presence or absence of an occupant in the seat, *the determination whether the occupant has characteristics of a child and the determined position of the occupant relative to the airbag module,*
- the step of determining whether an occupant is present in the seat comprising the steps of:
  - receiving waves from a space above a seat portion of the seat; and
  - generating a signal representative of the presence or absence of an occupant in the seat based on the received waves,
  - the step of receiving waves comprising the step of arranging a receiver capable of receiving electromagnetic waves in the vehicle in a position to receive electromagnetic waves from the space above the seat portion of the seat,
- *the step of controlling deployment of the side airbag comprising suppressing deployment of the side airbag based on the absence or presence of the occupant, the determination of whether the occupant has characteristics of a child and the determined position of the occupant,*
- *the step of determining the position of the occupant comprising determining the position of the head of the occupant,*
- *the step of suppressing deployment of the side airbag comprising:*
- *suppressing deployment of the side airbag when an occupant is not determined to be present; and*
- *suppressing deployment of the side airbag when the occupant is determined to have characteristics of a child and the head of the child is against the airbag module.*

38. A method for controlling deployment of a side airbag from an airbag module *on a side of the vehicle* to protect an occupant in a seat of a vehicle in a crash *when the occupant is present*, comprising the steps of:
- determining whether an occupant is present in the seat *based on reception of waves from a space above a seat portion of the seat,*
- determining whether the occupant has characteristics of a child,
- determining the position of the occupant *when the occupant is present in the seat* relative to the airbag module, and
- controlling deployment of the side airbag based on the presence or absence of an occupant in the seat, *the determination whether the occupant has characteristics of a child and the determined position of the occupant relative to the airbag module,*
- the step of controlling deployment of the side airbag comprising [at least one of the steps of] suppressing deployment of the side airbag [,] *based on the presence or absence of the occupant and the determined position of the occupant, and when deployment is not suppressed, at least one of the steps of* controlling a time at which deployment of the side airbag starts, controlling a rate of gas flow into the side airbag, controlling a rate of gas flow out of the side airbag and controlling a rate of deployment of the side airbag,
- *the step of determining the position of the occupant comprising determining the position of the head of the occupant,* the step of suppressing deployment of the side airbag comprising:
suppressing deployment of the side airbag when an occupant is not determined to be present; and
suppressing deployment of the side airbag when the occupant is determined to have characteristics of a child and the head of the child is against the airbag module.

39. The arrangement of claim 1, wherein said determining means further comprise a plurality of receivers for receiving waves from the space above the seat portion of the seat, said processor being coupled to said plurality of receivers and being arranged to identify the occupant to determine whether the occupant has characteristics of a child based on the waves received by said plurality of receivers.

40. The arrangement of claim 39, wherein said processor is arranged to apply a pattern recognition technique in order to identify the occupant to determine whether the occupant has characteristics of a child based on the waves received by said plurality of receivers.

41. The arrangement of claim 39, wherein processor is arranged to apply a pattern recognition technique in order to determine whether the head of the child is against the airbag module based on the waves received by said plurality of receivers and the waves received by said at least one receiver.

42. The arrangement of claim 29, wherein said determining means further comprise a plurality of receivers for receiving waves from the space above the seat portion of the seat, said processor being coupled to said plurality of receivers and being arranged to identify the occupant to determine whether the occupant has characteristics of a child based on the waves received by said plurality of receivers.

43. The arrangement of claim 42, wherein said processor is arranged to apply a pattern recognition technique in order to identify the occupant to determine whether the occupant has characteristics of a child based on the waves received by said plurality of receivers.

44. The arrangement of claim 42, wherein processor is arranged to apply a pattern recognition technique in order to determine whether the head of the child is against the airbag module based on the waves received by said plurality of receivers and the waves received by said at least one receiver.

45. The method of claim 16, wherein the step of suppressing deployment of the side airbag when the occupant is has characteristics of a child and the head of the child is against the airbag module consists of suppressing deployment of the side airbag when the head of the child is positioned against the airbag module.

46. The method of claim 16, wherein the step of determining the position of the head of the occupant comprises receiving waves from the space above the seat portion of the seat and processing the waves using a pattern recognition system to output a determination of whether the head of the occupant is against the airbag module.

47. The method of claim 16, wherein the step of determining whether the occupant has characteristics of a child comprises receiving waves from the space above the seat portion of the seat and processing the waves using a pattern recognition system to output a determination of whether the occupant has characteristics of a child.

48. The method of claim 35, wherein the step of suppressing deployment of the side airbag when the occupant is has characteristics of a child and the head of the child is against the airbag module consists of suppressing deployment of the side airbag when the head of the child is positioned against the airbag module.

49. The method of claim 35, wherein the step of determining the position of the head of the occupant comprises receiving waves from the space above the seat portion of the seat and processing the waves using a pattern recognition system to output a determination of whether the head of the occupant is against the airbag module.

50. The method of claim 35, wherein the step of determining whether the occupant has characteristics of a child comprises receiving waves from the space above the seat portion of the seat and processing the waves using a pattern recognition system to output a determination of whether the occupant has characteristics of a child.

51. The method of claim 36, wherein the step of suppressing deployment of the side airbag when the occupant is has characteristics of a child and the head of the child is against the airbag module consists of suppressing deployment of the side airbag when the head of the child is positioned against the airbag module.

52. The method of claim 36, wherein the step of determining the position of the head of the occupant comprises receiving waves from the space above the seat portion of the seat and processing the waves using a pattern recognition system to output a determination of whether the head of the occupant is against the airbag module.

53. The method of claim 36, wherein the step of determining whether the occupant has characteristics of a child comprises receiving waves from the space above the seat portion of the seat and processing the waves using a pattern recognition system to output a determination of whether the occupant has characteristics of a child.

\* \* \* \* \*

(12) EX PARTE REEXAMINATION CERTIFICATE (9735th)
United States Patent
Breed et al.

(10) Number: US 6,712,387 C2
(45) Certificate Issued: *Jul. 1, 2013

(54) METHOD AND APPARATUS FOR CONTROLLING DEPLOYMENT OF A SIDE AIRBAG

(75) Inventors: David S. Breed, Boonton Township, Morris County, NJ (US); Wilbur E. DuVall, Kimberling City, MO (US); Wendell C. Johnson, San Diego, CA (US)

(73) Assignee: Automotive Technologies International, Inc., Denville, NJ (US)

Reexamination Request:
No. 90/011,452, Jan. 21, 2011

Reexamination Certificate for:
Patent No.: 6,712,387
Issued: Mar. 30, 2004
Appl. No.: 09/437,535
Filed: Nov. 10, 1999

Reexamination Certificate C1 6,712,387 issued Nov. 9, 2010

Certificate of Correction issued Jun. 14, 2011

( * ) Notice: This patent is subject to a terminal disclaimer.

Related U.S. Application Data

(63) Continuation-in-part of application No. 09/047,703, filed on Mar. 25, 1998, now Pat. No. 6,039,139, which is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, and a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned.

(51) Int. Cl.
*B60N 2/00* (2006.01)

(52) U.S. Cl.
USPC .......................... 280/735; 180/272; 180/273

(58) Field of Classification Search
None
See application file for complete search history.

(56) References Cited

To view the complete listing of prior art documents cited during the proceeding for Reexamination Control Number 90/011,452, please refer to the USPTO's public Patent Application Information Retrieval (PAIR) system under the Display References tab.

*Primary Examiner* — Robert M. Fetsuga

(57) ABSTRACT

An arrangement and method for controlling deployment of a side airbag from an airbag module to protect an occupant in a seat of a vehicle in a crash. The presence of an occupant and/or position of the occupant or a part thereof is/are determined and deployment of the side airbag is controlled based thereon. To determine the presence of the occupant and/or position of the occupant or part thereof, a transducer is arranged to receive waves from a space above a seat portion of the seat and a signal representative of the presence and/or position of the occupant is generated based on the waves received by the transducer. The transducer can be designed to transmit waves into the space above the seat portion of the seat which are also receivable thereby. The transducer may be mounted in a door of the vehicle to enable the distance between the occupant and the door to be determined, i.e., to determine whether the occupant is leaning against the door, and possibly adjacent the airbag module if it is situated in the door. In these cases, deployment of the side airbag can be suppressed. In the alternative the time at which deployment of the side airbag starts, the rate of gas flow into the side airbag, the rate of gas flow out of the side airbag and/or the rate of deployment of the side airbag is/are controlled.

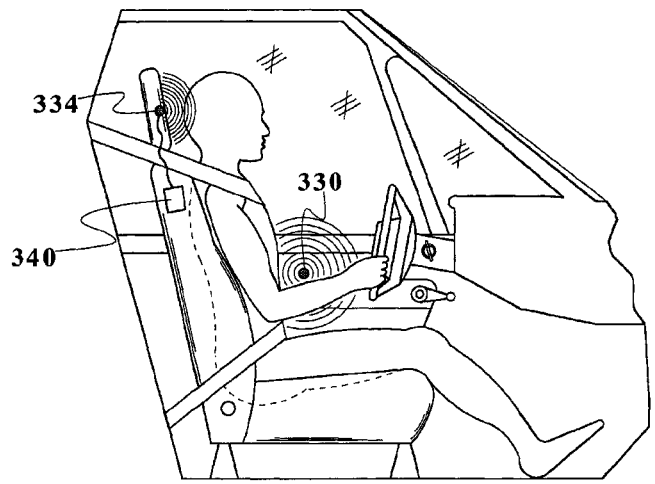

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 41, 44, 46, 49 and 52 is confirmed.

Claims 13, 14 and 28 were previously cancelled.

Claims 1-12, 15-27, 29-40, 42, 43, 45, 47, 48, 50, 51 and 53 are cancelled.

\* \* \* \* \*